United States Patent [19]

Hanvey, Jr. et al.

[11] Patent Number: 5,772,126
[45] Date of Patent: Jun. 30, 1998

[54] SYSTEM AND PROCESS FOR RECYCLING WASTE MATERIAL PRODUCED BY A GLASS FIBERIZING PROCESS

[75] Inventors: Curtis L. Hanvey, Jr., Boiling Springs; Irvin L. Koelle, Shelby, both of N.C.

[73] Assignee: PPG Industries, Inc., Pittsburgh, Pa.

[21] Appl. No.: 746,045

[22] Filed: Nov. 6, 1996

[51] Int. Cl.⁶ .......................... B02C 19/12; B02C 23/08
[52] U.S. Cl. .......................... 241/19; 241/23; 241/24.3; 241/29; 241/65; 241/79.1; 241/152.2
[58] Field of Search ................................ 241/18, 19, 23, 241/24.22, 24.3, 29, 65, 79.1, 152.2, DIG. 38, 5

[56] References Cited

U.S. PATENT DOCUMENTS

| | | |
|---|---|---|
| 1,417,961 | 5/1922 | Williams . |
| 2,310,005 | 2/1943 | Wilson .................................... 106/218 |
| 2,728,972 | 1/1956 | Drummond et al. ........................ 28/1 |
| 2,873,718 | 2/1959 | Brautigam ............................... 118/234 |
| 3,595,485 | 7/1971 | Dunbar et al. .............................. 241/4 |
| 3,725,022 | 4/1973 | Mills et al. ................................. 65/27 |
| 3,847,664 | 11/1974 | Gravel ........................................ 134/2 |
| 3,852,108 | 12/1974 | Lindberg .................................... 134/2 |
| 3,912,534 | 10/1975 | Gurta ......................................... 134/19 |
| 4,024,647 | 5/1977 | Schaefer ..................................... 34/12 |
| 4,054,434 | 10/1977 | Thomas et al. .............................. 65/2 |
| 4,065,282 | 12/1977 | Morey ........................................ 65/28 |
| 4,145,202 | 3/1979 | Gordin et al. ................................ 65/2 |
| 4,244,720 | 1/1981 | Boen et al. .................................. 65/8 |
| 4,252,551 | 2/1981 | Nishimura .................................. 65/28 |
| 4,309,204 | 1/1982 | Brooks ....................................... 65/28 |
| 4,341,353 | 7/1982 | Hamilton et al. ......................... 241/24 |
| 4,347,073 | 8/1982 | Aubourg et al. ............................. 65/28 |

(List continued on next page.)

FOREIGN PATENT DOCUMENTS

| | | |
|---|---|---|
| 1068248 | 12/1979 | Canada . |
| 1161009 | 1/1984 | Canada . |
| 1207279 | 7/1986 | Canada . |
| 2090139 | 9/1993 | Canada . |
| 164814 | 4/1981 | Denmark . |
| 833639 | 3/1983 | Denmark . |
| 0100942 | 12/1989 | European Pat. Off. . |
| 0389314 | 11/1994 | European Pat. Off. . |
| 0633110 | 11/1995 | European Pat. Off. . |

(List continued on next page.)

OTHER PUBLICATIONS

K. Loewenstein, *The Manufacturing Technology of Continuous Glass Fibres*, (2d.Ed. 1983) pp. 216–217.
"Carter–Day Fractionating Aspirator", Technical Bulletin No. FA–2, Carter–Day International, Inc. (Nov. 1985).
K. Loewenstein, *The Manufacturing Technology of Continuous Glass Fibres*, (3d.Ed. 1993) pp. 25, 30–44, 45–60, 115–122, 126–135, 165–173, 209–210, 237–287, 331.
R. Perry et al., *Chemical Engineers' Handbook*, (5th Ed. 1973), pp. 21–39 to 21–45 and 8–30 to 8–40.
Phoenix Fibreglass Inc. Product Bulletin (No Date Given).
"Composite Recyclate—raw material for the future", a technical bulletin of Encom Composite Recycling GmbH Germany (No Date Given).

(List continued on next page.)

*Primary Examiner*—John M. Husar
*Attorney, Agent, or Firm*—Ann Marie Odorski

[57] ABSTRACT

The waste material processing system of the present invention includes a (1) waste material supply; (2) shredder; (3) moisture reducing device; (4) crusher having a rotatable screw auger positioned within a cavity of the crusher for crushing and conveying waste material and a pressurizing device such as a conduit attached to the discharge end of the cavity for exerting a backpressure upon a portion of the waste material positioned about the second end of the auger such that a portion of the scrap glass fibers in the waste material is crushed; (5) dryer; and (6) separating device for separating waste material having a mean average length of less than about 5 millimeters from oversized dried waste material. Also provided by the present invention is a process for recycling waste material using the system.

30 Claims, 11 Drawing Sheets

U.S. PATENT DOCUMENTS

| | | | |
|---|---|---|---|
| 4,353,725 | 10/1982 | Homan et al. | 65/27 |
| 4,390,647 | 6/1983 | Girgis | 523/212 |
| 4,397,692 | 8/1983 | Ramage et al. | 134/2 |
| 4,422,862 | 12/1983 | Wardlaw | 65/28 |
| 4,432,780 | 2/1984 | Propster et al. | 65/2 |
| 4,462,815 | 7/1984 | Propster et al. | 65/2 |
| 4,507,197 | 3/1985 | Koenig et al. | 209/2 |
| 4,511,328 | 4/1985 | Ramage et al. | 432/89 |
| 4,531,960 | 7/1985 | Desprez | 65/134 |
| 4,580,132 | 4/1986 | Kato et al. | 340/540 |
| 4,592,723 | 6/1986 | Seng | 432/13 |
| 4,681,802 | 7/1987 | Gaa et al. | 428/288 |
| 4,795,678 | 1/1989 | Girgis | 428/391 |
| 4,825,158 | 4/1989 | Watabe et al. | 324/237 |
| 4,840,755 | 6/1989 | Nakazawa et al. | 264/15 |
| 4,853,024 | 8/1989 | Seng | 65/335 |
| 5,063,860 | 11/1991 | Vojetch | 110/256 |
| 5,100,453 | 3/1992 | Richards | 65/27 |
| 5,102,055 | 4/1992 | Buschmann et al. | 241/5 |
| 5,156,545 | 10/1992 | Deblock et al. | 432/8 |
| 5,167,738 | 12/1992 | Bichot et al. | 156/62 |
| 5,179,902 | 1/1993 | Vojetch | 110/248 |
| 5,186,112 | 2/1993 | Vojetch | 110/256 |
| 5,207,572 | 5/1993 | Deblock et al. | 432/58 |
| 5,251,827 | 10/1993 | Sims et al. | 241/24 |
| 5,274,896 | 1/1994 | Saltin | 29/403.1 |
| 5,297,741 | 3/1994 | Zurn et al. | 241/14 |
| 5,312,052 | 5/1994 | Dellekamp | 241/24 |
| 5,352,258 | 10/1994 | DeGreve et al. | 65/474 |
| 5,352,260 | 10/1994 | Carlson et al. | 65/469 |
| 5,364,426 | 11/1994 | Richards | 65/474 |
| 5,462,234 | 10/1995 | Patzelt et al. | 241/19 |
| 5,484,109 | 1/1996 | Cook | 241/73 |
| 5,496,392 | 3/1996 | Sims et al. | 75/414 |
| 5,585,180 | 12/1996 | Fadell | 241/5 |

FOREIGN PATENT DOCUMENTS

| | | |
|---|---|---|
| 2153226 | 5/1973 | France . |
| 2432999 | 11/1992 | France . |
| 1421756 | 3/1982 | Germany . |
| 2025148 | 4/1993 | Germany . |
| 8187466 | 6/1992 | Japan . |
| 1310249 | 3/1973 | United Kingdom . |
| 1391297 | 4/1975 | United Kingdom . |
| 2067729 | 7/1981 | United Kingdom . |
| 2112771 | 7/1983 | United Kingdom . |
| WO90/12760 | 11/1990 | WIPO . |
| WO91/03435 | 3/1991 | WIPO . |

OTHER PUBLICATIONS

Carter–Day Fractionating Aspirator 24" & 48" Instruction Manual, Carter–Day International, Inc., 1994.

I. Rubin, *Handbook of Plastic Materials and Technology*, 1990, pp. 955–1062, 1179–1215, 1225–1271.

"Increase Productivity and Profits with the E–Z TEC® III Metal Detector", Eriez Magnetics (No Date Given).

5,772,126

SYSTEM AND PROCESS FOR RECYCLING WASTE MATERIAL PRODUCED BY A GLASS FIBERIZING PROCESS

CROSS REFERENCE TO RELATED APPLICATION

This patent application is related to the copending U.S. Patent Application of Curtis L. Hanvey, Jr. entitled "SYSTEMS AND PROCESSES FOR RECYCLING GLASS FIBER WASTE MATERIAL INTO GLASS FIBER PRODUCT", filed concurrently with the present patent application.

FIELD OF THE INVENTION

The present invention relates to recycling waste material produced by a glass fiberizing process and, more particularly, to processing waste glass fibers for reuse as a glass fiber batch melt ingredient.

BACKGROUND OF THE INVENTION

As raw material and waste disposal costs for glass fiber production escalate and environmental concerns regarding waste disposal increase, recycling waste glass fibers provides a cost effective means to decrease such costs and alleviate associated environmental concerns.

In the fiber glass industry, waste glass fibers can be produced in the fiber forming process and in subsequent processing operations, such as in the formation of yarns, fabrics, roving, chopped reinforcement and mat products. Various approaches have been used to process and recycle such waste glass fibers.

U.S. Pat. No. 5,352,258 discloses a process and apparatus which shred scrap glass fibers, dry the shredded glass fibers, remove contaminants such as metallic materials, and feed the shredded glass fibers to a glass melter. The feeder is preferably an auger feeder having a dead space at the end of the auger adjacent the melter. The dead space permits build up of shredded glass fiber material to insulate the metal auger from the heat of the melter, as discussed at column 11, lines 31–35 of the patent. The dead space has a length of around 1 to 12 inches along the longitudinal axis of the auger and before the interior of the melter, as discussed at column 13, lines 5–11.

U.S. Pat. No. 4,145,202 discloses a method for processing waste glass strands which includes the steps of cutting and draining free water from the glass strands, removing metal from the strands, drying and incinerating the strands, sieving the strands and, if the particles are too large, grinding or milling the strands to 60 to 325 mesh range.

Typical grinding and milling operations are energy-intensive, have high maintenance costs and therefore are not economically desirable to include in a recycling process. Also, it is often difficult to pneumatically convey recycled glass fibers. There is a need for a system and process for recycling glass fibers which requires minimal energy input, is efficient, durable, inexpensive, and provides glass fiber material which is conveyable by pneumatic transport and compatible with the glass melt.

SUMMARY OF THE INVENTION

The present invention provides a waste material processing system comprising: (a) a waste material supply, the waste material being produced by a glass fiberizing process and comprising scrap glass fibers; (b) a shredder positioned to receive waste material from the waste material supply, the shredder for shredding the waste material to form shredded waste material; (c) a moisture reducing device positioned to receive shredded waste material from the shredder, the moisture reducing device for reducing the mean average moisture content of the shredded waste material to form moisture-reduced waste material; (d) a crusher comprising: (1) a body comprising a cavity having a first end positioned to receive the moisture-reduced waste material from the moisture reducing device, a second end distal to the first end, and a length therebetween; (2) a rotatable screw auger positioned within the cavity of the body for crushing and conveying the moisture-reduced waste material from the first end of the cavity in a first direction toward the second end of the cavity, the auger having a first end proximate the first end of the cavity, a second end proximate the second end of the cavity, and a length therebetween; and (3) a pressurizing device for exerting a pressure ranging from about $1.38 \times 10^4$ to about $5.51 \times 10^6$ pascals upon at least a portion of the moisture-reduced waste material positioned about the second end of the auger in a direction generally opposite to the first direction in which the auger conveys the moisture-reduced waste material such that the portion of the scrap glass fibers in the moisture-reduced waste material is crushed to form crushed glass fibers; (e) a dryer positioned to receive the moisture-reduced waste material from the crusher, the dryer for drying the moisture-reduced waste material to form dried waste material having a mean average moisture content of less than about one weight percent; and (f) a separating device positioned to receive the dried waste material from the dryer, the separating device for separating the dried waste material into a first portion of dried waste material having a mean average length of less than about 5 millimeters from oversized dried waste material.

Also provided by the present invention is a waste material processing system comprising: (a) a waste material supply comprising waste material produced by a glass fiberizing process and comprising scrap glass fibers; (b) a shredder positioned to receive waste material from the waste material supply, the shredder for shredding the waste material to form shredded waste material; (c) a moisture reducing device positioned to receive shredded waste material from the shredder, the moisture reducing device for reducing the mean average moisture content of the shredded waste material to form moisture-reduced waste material; (d) a pulverizer positioned to receive the moisture-reduced waste material from the moisture reducing device, the pulverizer for pulverizing a major portion of the moisture-reduced waste material into pulverized waste material having a mean average length of less than about 20 mesh; (e) a dryer positioned to receive the moisture-reduced waste material from the pulverizer, the dryer for drying the moisture-reduced waste material to form dried waste material having a mean average moisture content of less than about one weight percent; and (f) a separating device positioned to receive the dried waste material from the dryer, the separating device for separating the dried waste material into a first portion of dried waste material having a mean average length of less than about 3 millimeters from oversized dried waste material.

Also provided by the present invention is a process for recycling waste material produced by a glass fiberizing process, the waste material comprising scrap glass fibers, the process comprising the steps of: (a) shredding glass fiber waste material; (b) drying the glass fiber waste material to form moisture-reduced waste material; (c) crushing the moisture-reduced waste material in a crusher comprising: (1) a body comprising a cavity having a first end positioned to receive the moisture-reduced waste material from the moisture reducing device, a second end distal to the first end, and a length therebetween; (2) a rotatable screw auger positioned within the cavity of the body for crushing and conveying the moisture-reduced waste material from the first end of the cavity in a first direction toward the second end of the cavity, the auger having a first end proximate the first end of the cavity, a second end proximate the second end of the cavity, and a length therebetween; and (3) a pressurizing device exerting a pressure ranging from about $1.38 \times 10^4$ to about $5.51 \times 10^6$ pascals upon at least a portion of the moisture-reduced waste material positioned about the second end of the auger in a direction generally opposite to the first direction in which the auger conveys the moisture-reduced waste material such that the portion of the scrap glass fibers in the moisture-reduced waste material is crushed to form crushed glass fibers; (d) drying the moisture-reduced waste material received from the crusher; (e) separating a first portion of dried waste material having a mean average length of less than about 5 millimeters from oversized dried waste material; and (f) feeding the first portion of the dried waste material to a glass melter.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE INVENTION

Figure 1:
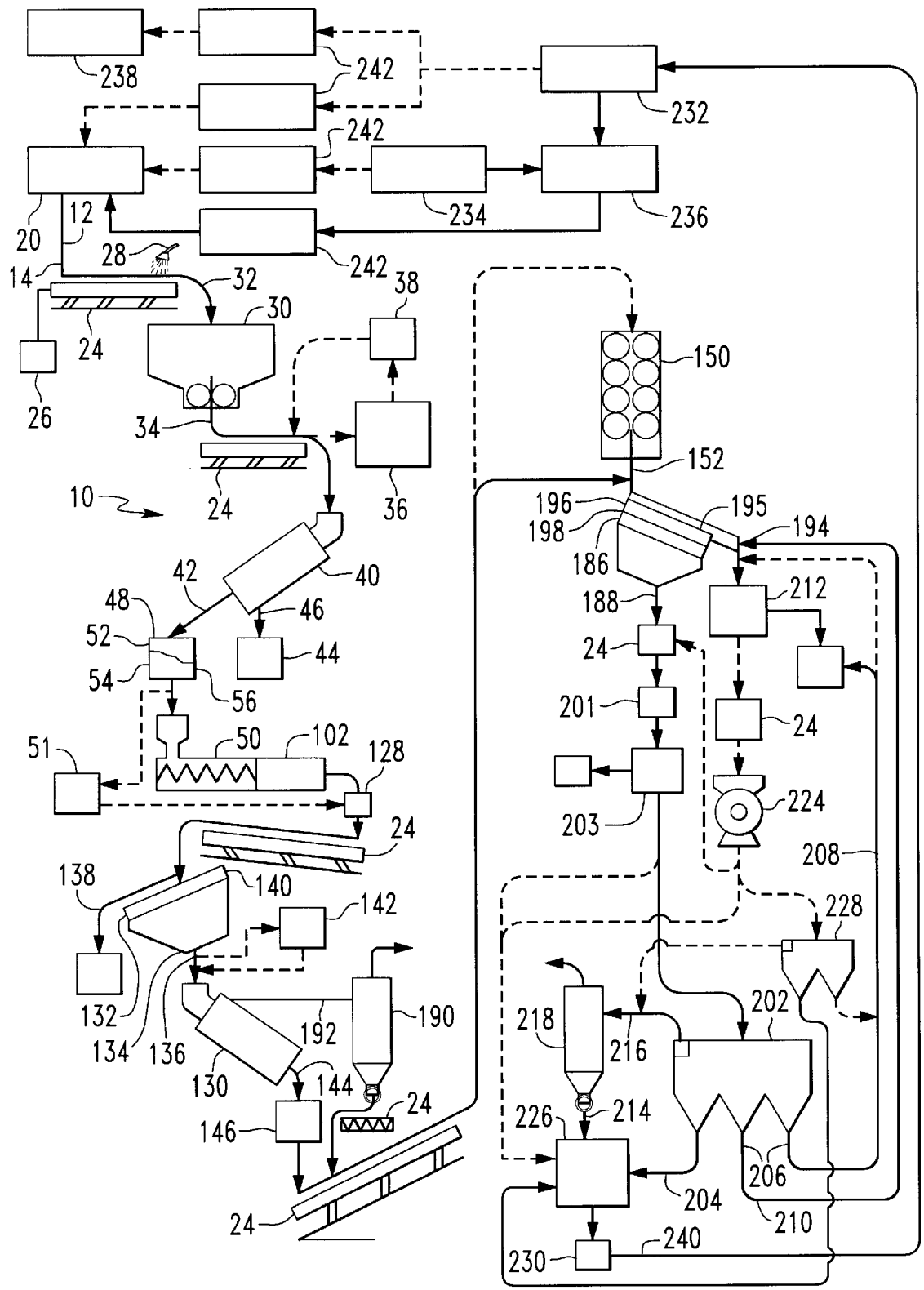
FIG. 1 is a schematic diagram of a preferred waste material processing system including additional and alternative components, in accordance with the present invention.

The system and process of the present invention represent an economical, durable and environmentally beneficial advance in glass fiber recycling technology which provides efficient recycling of glass fiber to a glass melting and fiber forming (drawing) operation. Advantages of the system and process of the present invention include that the resulting glass fiber product can be readily pneumatically transported to facilitate recycling of the product to the glass melter and that the system can easily accommodate waste from other glass fiber forming and processing facilities. Recyclable glass fibers produced using the system and process of the present invention surprisingly can have relatively smooth ends and low surface organic levels. The system and process of the present invention also provide the capability to consolidate waste from different glass fiber forming facilities.

In the manufacture and processing of glass fibers, several different types of waste or scrap glass materials suitable for recycling are generated, including vitrified glass forming materials such as cullet, frit, glass marbles and glass beads; glass fibers which break during winding or payout, do not meet size or composition specifications or contain defects such as seeds; waste strands of glass fibers generated at the beginning or end of the winding process; strands which are not properly coated to specification; fibers which are fed through the pull roller device when forming packages are not being wound; and discarded forming packages which do not meet specifications. Other sources of glass fiber waste material include fabrication operations such as drying, twisting, weaving, roving and mat fabrication operations, to name a few.

Glass fibers are a class of fibers generally accepted to be based upon oxide compositions such as silicates selectively modified with other oxide and non-oxide compositions. Useful glass fibers can be formed from any type of fiberizable glass composition known to those skilled in the art, and include those prepared from fiberizable glass compositions such as "E-glass", "A-glass", "C-glass", "D-glass", "R-glass", "S-glass", and E-glass derivatives that are fluorine-free and/or boron-free. As used herein, the term "fibers" means a plurality of individual glass filaments. As used herein, the term "fiberizable" means a material capable of being formed into a generally continuous filament, fiber, strand or yarn. The preferred glass fibers to be recycled using the system and process of the present invention are E-glass fibers.

Such compositions and methods of making glass fibers therefrom are well known to those skilled in the art and will be discussed in greater detail below. If additional information is needed, such glass compositions and fiberization methods are disclosed in K. Loewenstein, *The Manufacturing Technology of Glass Fibres*, (3d Ed. 1993) at pages 30–44, 47–60, 115–122 and 126–135, which are hereby incorporated by reference.

The waste material preferably includes glass fibers of the same composition as the glass melt. For example, it is preferred to use waste material containing E-glass fibers as a recycle material for an E-glass melt. However, glass fibers of different compositions can be used if any imbalance in components is compensated for by adjusting the proportions of the non-vitrified batch materials and adding any other components as necessary.

One or more coating compositions can be present on the surfaces of the glass fibers to be recycled, although preferably the glass fibers are essentially free of any coating compositions. Such coating compositions can be applied, for example, by sizing applicator in a manner discussed below. Although the glass fibers are preferably washed prior to shredding, a portion of the sizing composition can remain on the surfaces of the glass fibers. As used herein, "essentially free of any coating compositions" means that the glass fibers typically have less than about 10 weight percent of a coating upon the surfaces thereof and can have less than about 2 weight percent of a coating thereon. Preferably, the glass fibers have less than about 0.5 weight percent of a coating upon the surfaces thereof and are more preferably free of any coating composition.

Examples of coating compositions typically present on waste glass fibers include sizing compositions and secondary coating compositions. As used herein, the terms "size", "sized" or "sizing" refer to the aqueous coating composition applied to the filaments immediately after formation of the glass fibers. The term "secondary coating" refers to a coating composition applied secondarily to one or a plurality of strands after the sizing composition is applied, and preferably at least partially dried.

Typical sizing compositions can include as components film-formers such as starches, thermoplastic materials and/or thermosetting materials, lubricants, coupling agents, emulsifiers and water, to name a few. Examples of suitable sizing compositions are set forth in Loewenstein at pages 237–287 and U.S. Pat. Nos. 4,390,647, 4,681,802 and 4,795,678, each of which is hereby incorporated by reference.

The waste materials can include not only glass fiber materials, but also non-glass materials typically discarded during a glass fiber forming operation, such as cardboard forming tubes, graphite gathering shoes, refractory materials from the glass melting furnace such as chrome oxide, zircon and mullite, steel knives which are used to sever the strand during forming and chunks of hardened sizing composition.

Preferably, the waste materials are essentially free of, and more preferably free of, cured matrix materials from reinforced composites. As used herein, the phrase "essentially free of cured matrix materials from reinforced composites" means that the waste materials utilized in the present invention preferably comprise less than about 5 weight percent and more preferably less than about 1 weigh percent of cured matrix materials from reinforced composites on a total solids basis.

Figure 10:
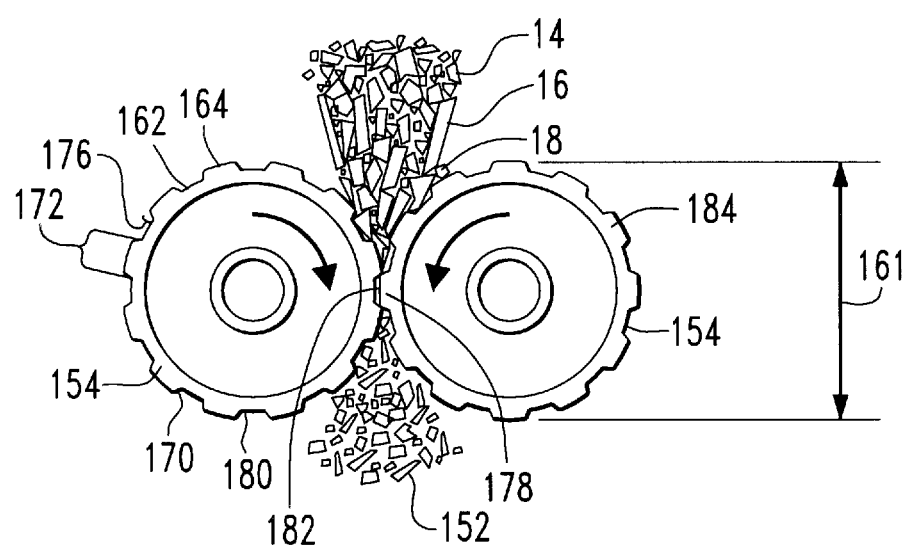
FIG. 10 is an end view of the pair of rollers of the roller crusher of FIG. 9, in accordance with the present invention.
Figure 11:
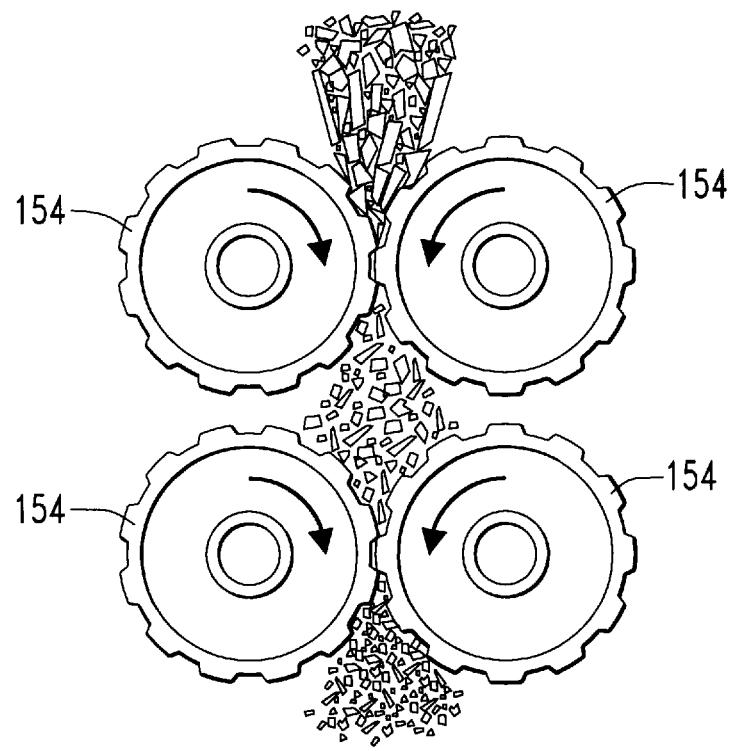
FIG. 11 is an end view of a plurality of rollers of a roller crusher which is useful in the present waste material processing system, in accordance with the present invention.
Figure 12:
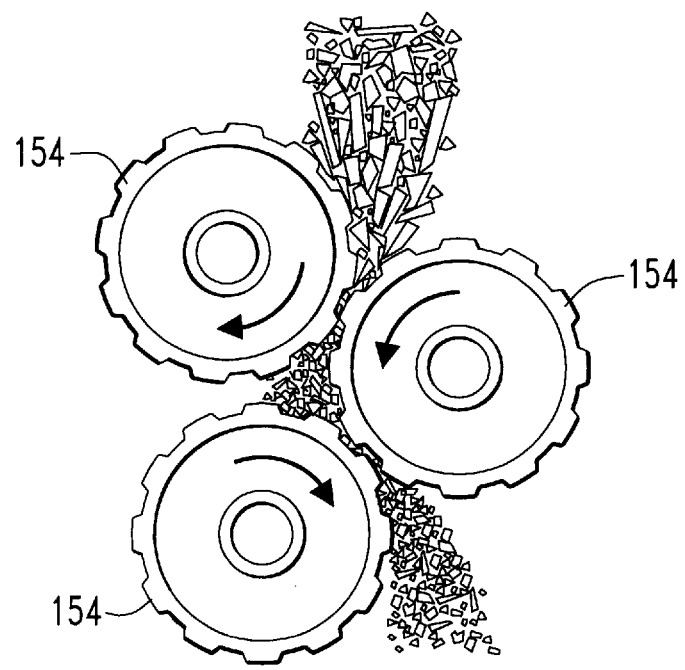
FIG. 12 is an end view of a preferred configuration of a plurality of rollers of a roller crusher which is useful in the present waste material processing system, in accordance with the present invention.

Referring to the drawings, wherein like numerals indicate like elements throughout, there is shown in FIG. 1 a waste material processing system, generally designated 10, comprising one or more waste material supplies 12. The waste material supply 12 comprises waste material 14 produced by a glass fiberizing process, which will be discussed in detail below. As shown in FIGS. 10–12, the waste material 14 comprises scrap glass fibers 16 and non-glass materials 18 such as are discussed in detail above.

The amount of waste material 14 to be processed by the system 10 can be about 0.2 to about 10 metric tons per hour (about 500 to about 22,000 pounds per hour, and is preferably about 3 to about 7 metric tons per hour (about 6500 to about 15,000 pounds per hour). The moisture content of the waste material 14 can range from about 1 to about 50 weight percent on a total weight basis.

The mean average length of the scrap glass fibers 16 of the waste material supply 12 can be about 0.025 to about 200 meters and preferably about 0.5 to about 50 meters. More preferably, the mean average length of the scrap glass fibers 16 ranges from about 0.5 to about 5 meters.

The nominal filament diameters of suitable scrap glass fibers 16 (shown in FIG. 16) can range from about 3.5 micrometers (filament designation B) to about 24 micrometers (filament designation U) or larger. Other suitable nominal filament diameters are disclosed in Loewenstein at page 25 which is hereby incorporated by reference.

Figure 16:
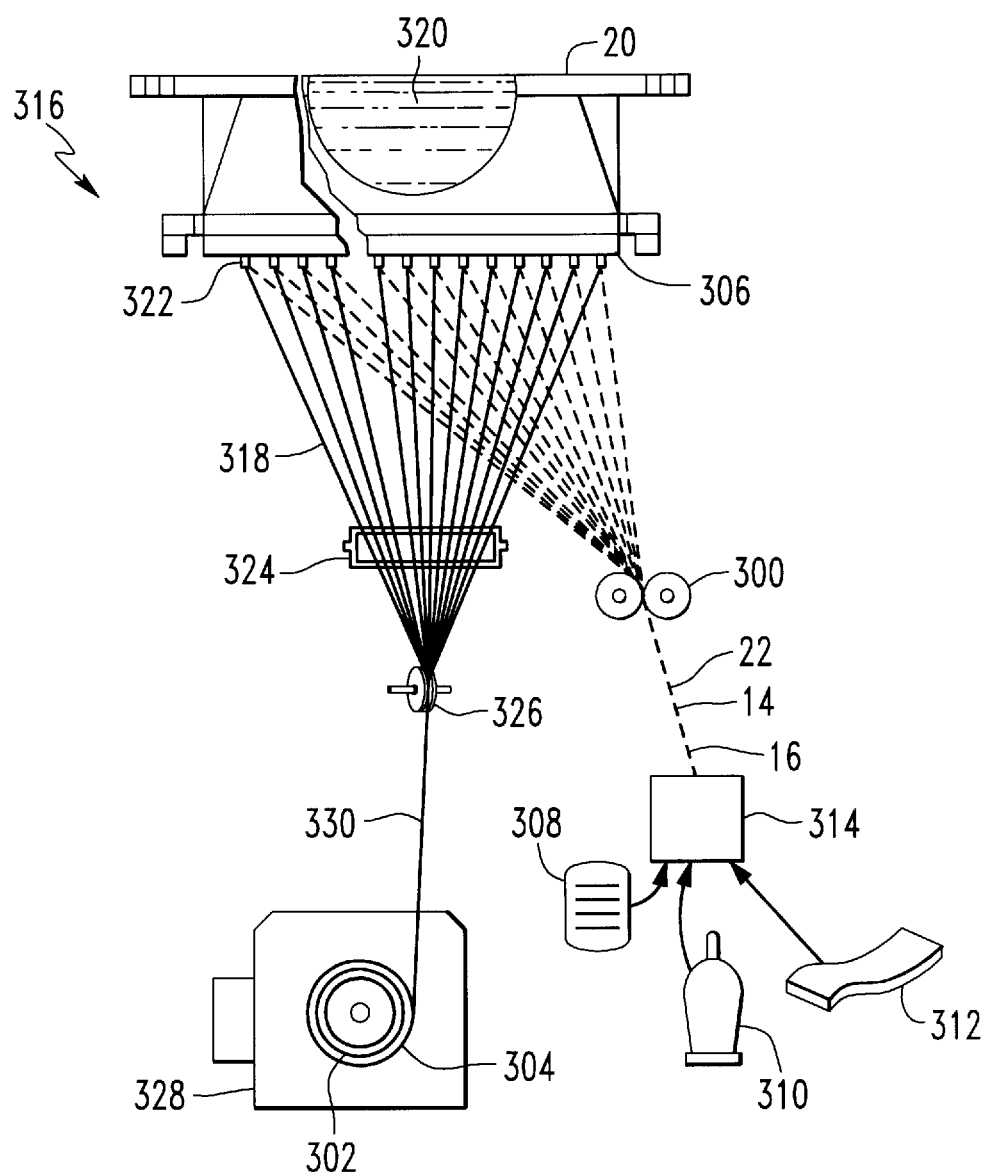
FIG. 16 is a schematic front elevational view of a fiber forming apparatus and winder according to the present invention
Figure 17:
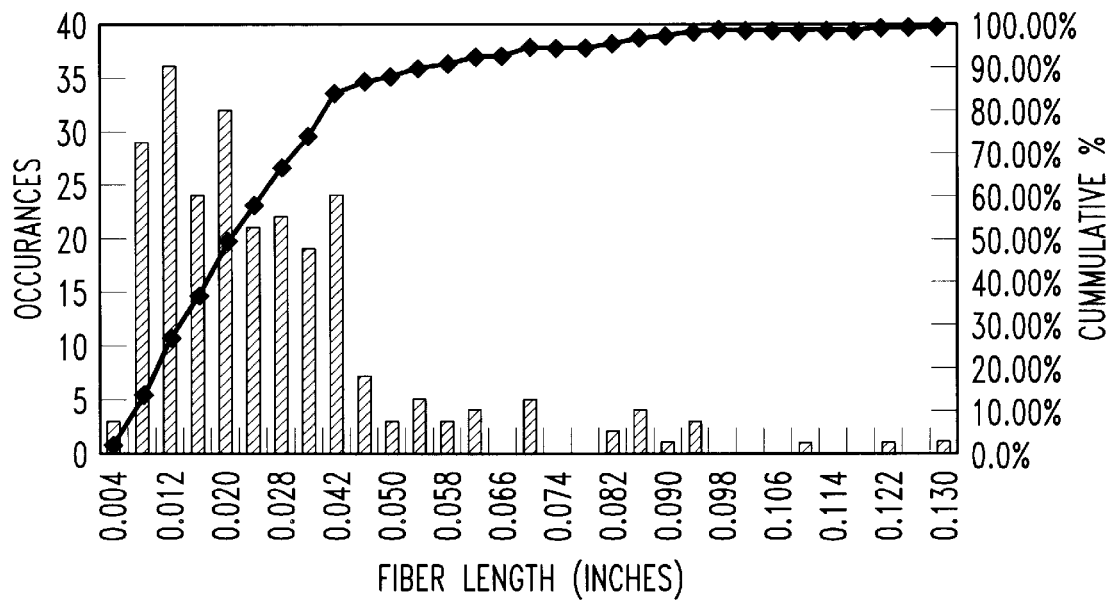
FIG. 17 is a bar chart of number of occurrences of specified fiber lengths of glass fibers in a sample.

Referring to FIG. 16, other useful scrap glass fibers 16 for recycling include those which are gathered together by a pull roll 300 during the glass fiber forming process, for example when a winding operation is not in progress. When coated with a sizing composition, such scrap glass fibers 16 tend to clump into bundles having a mean average diameter ranging from about 0.001 to about 0.025 meters.

Also useful for recycling by the present system and process are waste glass beads and pieces of frit produced during glass fiber formation, which typically have diameters ranging from about 0.001 to about 0.125 meters.

Bands of glass fibers which are wound about the endcap of a glass fiber forming collet 302 during the initial and final stages of the winding process, incomplete forming packages and/or forming packages 304 which do not meet specifications are also useful as waste materials 14 for recycling by the present system and process. Such bands typically have a width of about 0.05 meters, a length of about 0.4 to about 1 meters and a thickness of about 0.1 meters. Waste forming packages 304 useful in the present invention can have a width of about 0.4 meters, a length of about 0.4 to about 0.75 meters and a thickness of about 0.1 meters when flattened.

The waste material supply 12 can be obtained directly from a glass fiberizing operation 316 by collecting waste material 14 emanating from the bushings 306 of the glass melter 20 when the winding process is not in operation or by gathering the waste material 14 from other glass fiber product fabrication processes, such as roving 308, twisted strands 310 or mat 312, as discussed above. The waste material 14 can be collected continuously or batchwise as waste material 14 is accumulated. For example, the waste material supply 12 can be drawn directly from glass fibers 16 which are diverted through a pull roll 300 (shown in FIG. 16) and conveyed to the waste material processing system 10. Additionally or alternatively, one or more conventional storage containers 314 or bins can be used to accumulate material from a variety of different sources within glass fiberizing and product fabrication processes, such as are discussed above, and transported to the waste material processing system 10.

Figure 2:
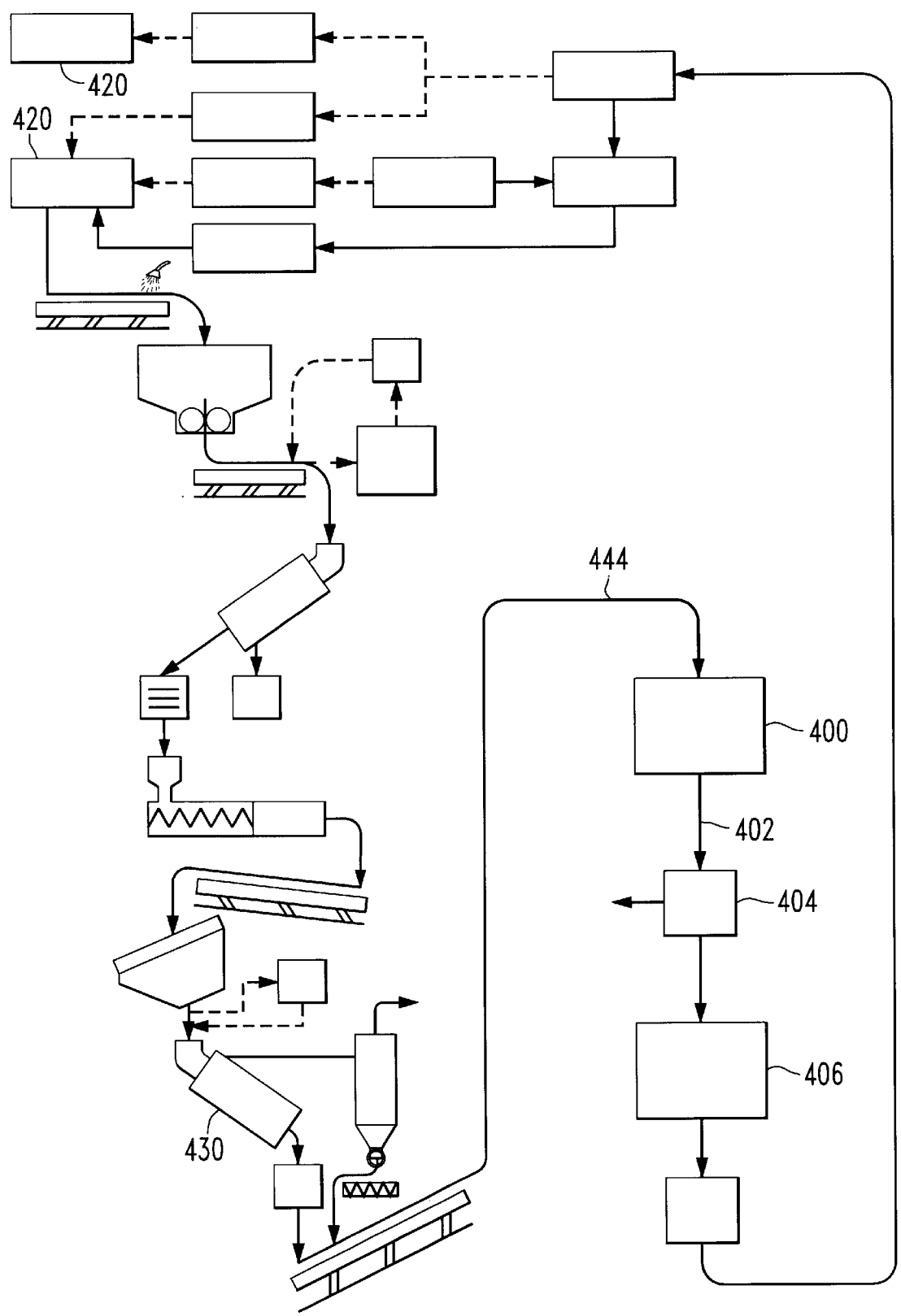
FIG. 2 is a schematic diagram of an alternative embodiment of a waste material processing system, in accordance with the present invention.

Referring now to FIGS. 1 and 2, the waste material processing system 10 preferably further comprises one or more conveyors 24 positioned between any of the system components for conveying the waste material 14 through the waste material processing system 10.

Preferably, the conveyor 24 is sufficiently wide and thick to stably accommodate the waste material 14 on the conveyor 24 and to prevent the waste material 14 from spilling from the conveyor 24 during transport. The width of the conveyor 24 can be about 0.3 to about 1.5 meters. The preferred conveyor 24 is about 1.3 meters (about 54 inches) wide. The length of the conveyor 24 can be any length suitable to convey the waste material 14 between components of the system 10. The thickness of the conveyor 24 can be about 0.005 to about 0.025 meters and can vary based upon such factors as the material from which the conveyor 24 is formed, dimensions and weight of the waste material 14 to be transported.

Non-limiting examples of suitable conveyors include vibratory conveyors, belt conveyors, screw conveyors, horizontal conveyors, and batch conveyors which transport a plurality of individual containers, each container holding a portion of waste material 14. The preferred conveyor 24 for use in the present invention has a double V-shaped trough which can be perforated to permit drainage, such as is commercially available from General Kinematics of Barrington, Ill. Screw and horizontal conveyors are also preferred for use in the present invention. Suitable screw conveyors are commercially available from Thomas Conveyor Co. of Fort Worth, Tex.

The conveyor 24 can be inclined with respect to horizontal to facilitate drainage of the waste material 14. Preferably, the conveyor 24 is inclined at about a 5 to about a 20 degree angle with respect to horizontal, and more is preferably about 15 degrees.

The conveyor 24 comprises a drive device 26, such as an eccentric direct drive motor. Preferably, the motor is a conventional AC eccentric direct drive motor of about 5 to about 50 horsepower. One skilled in the art would understand that any suitable motor and drive capable of providing power to move the waste material 14 from a first position to a second position spaced apart from the first position would be useful in the present invention. The conveyor 24 is preferably moved at a speed of about 4.5 to about 30 meters/minute, and more preferably about 12 meters/minute.

One skilled in the art would understand that one or a plurality of conveyors 24 can be used in the present system 10. Also, the conveyor 24 can be enclosed and/or heated, if desired.

Alternatively, some or all of the system components can be positioned such that the waste material 14 being discharged from a given component enters the inlet of the next component of the system 10 without intervening conveyors 24.

The waste material processing system 10 can further comprise one or more washers 28 positioned between the waste material supply 12 and the shredder 30 for washing the waste material 14 prior to shredding. Preferably, the waste material 14 is washed by spraying water upon the conveyor 24 using a conventional spray nozzle before the waste material 14 enters the shredder 30. The amount of water sprayed should be sufficient to remove at least a portion of any coating compositions present upon the glass fibers 16. The moisture content of the washed waste material 32 can be about 25 to about 50 weight percent on a total solids basis.

The waste material processing system 10 comprises one or more shredders 30 positioned to receive waste material 14 from the waste material supply 12, preferably by conveyor 24. The shredder 30 shreds the waste material 14 to form shredded waste material 34.

The shredder 30 can be any conventional shredder 30 useful for shredding glass fibers, such as are well known to those skilled in the art. Preferably the shredder 30 is capable of shredding about 0.5 to about 7 metric tons (about 1000 to about 15500 pounds) per hour of waste material 14. The shredder 30 preferably has a plurality of intermeshing disks, each disk having two or more cutting prongs. An example of a shredder 30 which is useful in the present invention is a SSI Model 3400H shredder having a direct hydraulic drive, which is commercially available from Shredder Systems, Inc. of Wilsonville, Oreg.

The mean average length of the scrap glass fibers 16 of the shredded waste material 34 is preferably about 0.05 to about 0.3 meters (about 2 to about 12 inches) or less, and more preferably is about 0.05 to about 0.15 meters (about 2 to about 6 inches). The non-glass waste materials 18 are preferably also shredded into similar lengths.

The waste material processing system 10 preferably further comprises one or more storage systems 36 for storing excess waste material 14, for example if one or more components of the system 10 are temporarily disabled. The storage system 36 can be, for example, a bunker or other conventional storage area well known to those skilled in the art. The capacity of the storage system 36 is preferably about 0.5 to about 250 metric tons. The storage system 36 preferably permits drainage and evaporation of excess moisture from the waste material 14.

The waste material processing system 10 preferably further comprises one or more feeders 38 for returning the waste material 14 in the storage system 36 to the system 10. The feeder 38 can be automatic or manual. The feeder 38 can be a bucket material handler or volumetric feeder and a conveyor 24, examples of which are discussed above. Preferably, the feeder 38 is a Bobcat bucket material handler.

The waste material processing system 10 comprises one or more moisture reducing devices 40 positioned to receive shredded waste material 34 from the shredder 30. The moisture reducing device 40 reduces the mean average moisture content of the shredded waste material 34 to form moisture-reduced waste material 42. The mean average moisture content of the moisture-reduced waste material 42 preferably ranges from about 5 to about 30 weight percent moisture on a total weight basis, and more preferably about 10 to about 25 weight percent.

The moisture reducing device 40 can be selected from dewatering devices, dryers, perforated screens, vibratory screens, centrifuges, presses or calciners, and combinations thereof. Preferably the moisture reducing device 40 is a dewatering device such as a rotary bulk dewaterer which is commercially available from General Kinematics. The preferred dewatering device is formed from stainless steel, has dimensions of about 3 meters (about 10 feet) long and about 1.5 meters (about 5 feet) wide, and is rotated by a conventional drive device such as a 30 horsepower (hp) motor. The rotational speed of the dewatering device is preferably about 10 to about 50 revolutions per minute. Suitable motors for rotating such dewatering devices at such speeds are well known to those skilled in the art.

The moisture reducing device 40 preferably further comprises one or more moisture separating devices 44 for receiving a moisture-laden stream 46 separated from the waste material 14 by the moisture reducing device 40 and separating moisture from any residual solids such as glass fibers in the moisture-laden stream 46, which can be recycled to the moisture reducing device 40, if desired. Non-limiting examples of suitable moisture separating devices 44 include hydrosieve metal fabric filter screens and settlers.

The waste material processing system 10 can further comprise one or more storage devices 48 positioned between the moisture reducing device 40 and the crusher 50 for receiving moisture-reduced waste material 42 from the moisture reducing device 40 and supplying the moisture-reduced waste material 42 to the crusher 50. The storage device 48 can be a conventional cascade storage system which comprises multiple storage units 52 arranged in parallel such that when a first storage unit 54 is filled with a portion of the moisture-reduced waste material, another portion of the moisture-reduced waste material subsequently received from moisture reducing device 40 is diverted to another storage unit 56. The capacity of each storage unit 52 depends upon such factors as the total waste material 14 to be processed by the system 10, and is preferably about 0.5 to about 5 metric tons.

The storage device 48 preferably has at least as many storage units 52 as crushers 50 in the system 10, such that each storage unit 52 is aligned to feed moisture-reduced waste material 42 into the corresponding crusher 50. The discharge chutes are preferably tubular and can be operated manually or preferably automatically as the level of waste material 14 in the corresponding crusher 50 decreases. Preferably the discharge chutes have a diameter ranging from about 0.25 to about 0.75 meters.

As discussed above, the waste material processing system 10 comprises one or more auger crushers 50 discussed below. Preferably, the waste material processing system 10 comprises six auger crushers 50, each auger crusher 50 accommodating about 1 metric ton per hour of material to be processed.

Figure 3:
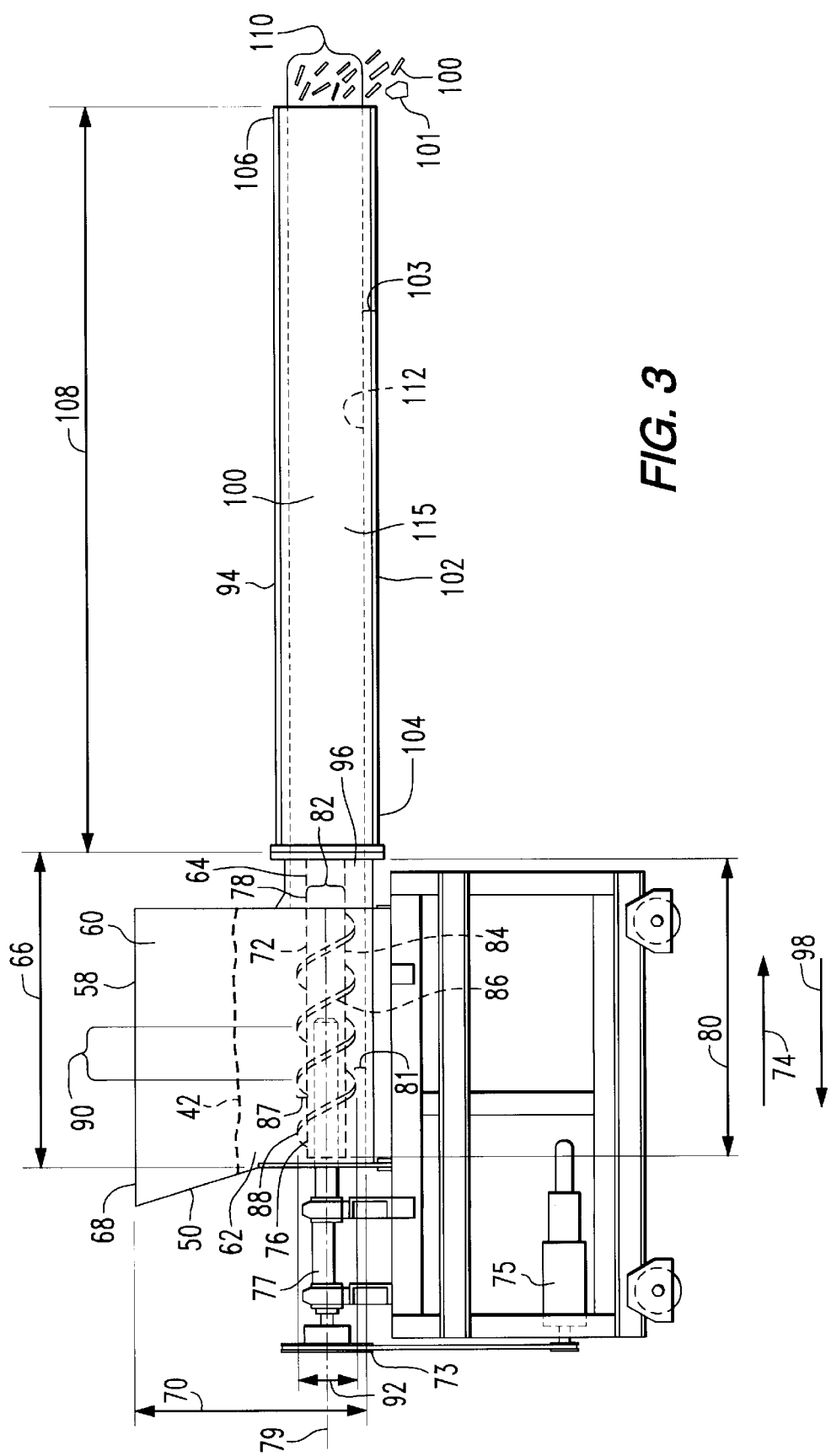
FIG. 3 is a side elevational view of a preferred auger crusher having a pressurizing device which is useful in the present waste material processing system, in accordance with the present invention.

Referring now to FIG. 3, the crusher 50 comprises a body 58 comprising a cavity 60 having a feed chute or first end 62 positioned to receive the moisture-reduced waste material 42 from the moisture reducing device 40, a second end 64 distal to the first end 62 in which at least the glass fibers of the moisture-reduced waste material 42 are crushed, and a length 66 therebetween. The walls of the feed chute are preferably angled to facilitate the flow of moisture-reduced waste material 42 into the cavity 60.

As shown in FIG. 3, the length 66 of the cavity 60 ranges from about 0.6 to about 1.8 meters, and is preferably about 1.5 meters. The cavity 60 has a width at the inlet 68 ranging from about 0.25 to about 1.25 meters, and is preferably about 0.75 meters (about 30 inches). The cavity 60 has a depth 70 ranging from about 0.75 to about 1.5 meters, and is preferably about 0.75 meters (about 30 inches).

Referring to FIG. 3, the crusher 50 comprises a rotatable screw auger 72 positioned within the cavity 60 of the body 58 for crushing and conveying the moisture-reduced waste material 42 from the first end 62 of the cavity 60 in a first direction 74 toward the second end 64 of the cavity 60. The auger 72 has a first end 76 proximate the first end 62 of the cavity 60, a second end 78 proximate the second end 64 of the cavity 60, and a length 80 therebetween.

The auger 72 is preferably formed from a metallic material such as carbon steel and can have a striated hard alloy coating on the faces of the flights 86, such as STOOL 101 flexcore MIG wire.

As shown in FIG. 3, the length 80 of the auger 72 preferably ranges from about 0.5 to about 1.75 meters, and is preferably about 1.4 meters (about 56 inches). The diameter 82 of the auger shaft 84 preferably ranges from about 0.075 to about 0.2 meters, and is preferably about 0.075 meters (about 3 inches).

The auger 72 includes a flight 86 having a plurality of peaks 88 along the length 80 of the auger 72, the distance 90 between adjacent peaks 88 ranging from about 0.35 to about 0.6 meters (about 14 to about 24 inches). Preferably, the first end 76 of the auger 72 has a right-handed pitch of about 0.55 meters (about 22 inches) and the second end 78 of the auger 72 has a right-handed pitch of 0.4 meters (about 16 inches). Including the flight 86, the auger 72 has an outer diameter 92 ranging from about 0.2 to about 0.4 meters, and is preferably about 0.2 meters. The height 87 of each flight 86 is preferably about 0.025 to about 0.1 meters (about 1 to about 4 inches), and is preferably about 0.038 meters (about 1.5 inches). The thickness of the flight is preferably about 0.006 to about 0.025 meters.

The flight 86 is positioned at an angle ranging from about 80° to about 100°, and preferably about 90°, with respect to a longitudinal axis of rotation 79 of the auger 72. The distance 81 between edge of the flight 86 and the cavity 60 is preferably about 0.025 to about 0.075 meters (about 1 to about 3 inches).

The auger 72 is rotated by a drive device 73 which comprises a motor 75 and a drive 77. The motor 75 can be any conventional motor for rotating an auger, such as about a 5 to about 40 horsepower AC motor having a variable speed gear reducer, such as a Baldor TEFC (totally enclosed fan cooled) motor. The speed of rotation of the auger 72 can range from about 5 to about 150 revolutions per minute, and is preferably about 5 to about 30 revolutions per minute.

The crusher 50 comprises a pressurizing device 94 proximate the second end 64 of the cavity 60 and the second end 78 of the auger 72 for exerting a pressure ranging from about $1.38 \times 10^4$ to about $5.51 \times 10^6$ pascals (about 2 to about 800 pounds per square inch) upon at least a portion 96 of the moisture-reduced waste material 42 positioned about the second end 78 of the auger 72 in a direction 98 generally opposite to the first direction 74 in which the auger 72 conveys the moisture-reduced waste material 42 such that the portion 96 of the scrap glass fibers 16 of the moisture-reduced waste material 42 are crushed to form crushed glass fibers 100 having a mean average dimension, such as length or width, of less than about 0.09 meters (about 3.5 inches), and preferably ranging from about 0.003 to about 0.006 meters (about ⅛ to about ¼ inches) or less.

Preferably, the pressurizing device 94 is a conduit 102 comprising a first end 104 positioned adjacent to, and preferably connected to, the second end 64 of the cavity 60 for receiving crushed glass fibers 100 from the second end 64 of the cavity 60. The conduit 102 also has a discharge or second end 106 and a length 108 between the first end 104 and the second end 106.

The crushed glass fibers 100 received from the second end 64 of the cavity 60 accumulate within the conduit 102 to exert backpressure upon at least the portion 96 of the moisture-reduced waste material 42 positioned about the second end 78 of the auger 72 in the direction 98 generally opposite to the first direction 74 in which the auger 72 conveys the moisture-reduced waste material 42 to provide resistance to the flow of the portion 96 of the moisture-reduced waste material 42 being conveyed through the cavity 60 and conduit 102 such that the portion 96 of the scrap glass fibers 16 in the moisture-reduced waste material 42 are crushed to form the crushed glass fibers 100.

The conduit 102 can be formed from a durable material such as a thermoplastic material, thermosetting material, or metallic material such as steel. Preferably, the conduit 102 is formed from a thermoplastic material such as polyvinyl chloride or acrylonitrile-butadiene-styrene polymer.

The conduit 102 is preferably generally circular in cross-section, although the conduit 102 can be generally oval, square, rectangular, or have any shape cross-section desired. Preferably, the cross-section of the conduit is generally uniform along the length 108 of the conduit 102, although the cross-section can vary, as discussed below.

The length 108 of the conduit 102 can range from about 0.9 to about 6 meters (about 3 to about 20 feet), is preferably about 0.9 to about 5 meters (about 3 to about 17 feet), and is more preferably about 1.8 to about 2.1 meters (about 6 to about 7 feet). The internal diameter 110 of the conduit 102 can range from about 0.15 to about 0.6 meters (about 6 to about 24 inches), and is preferably about 0.35 to about 0.4 meters (about 14 to about 16 inches). The thickness of the wall of the conduit 102 can range from about 0.01 to about 0.025 meters.

Preferably, the interior surface 112 of the conduit 102 is generally smooth as shown in FIG. 3, although the interior surface 112 can comprise one or more cross-sectional area restrictions to flow or protrusions 114 which project into the interior 115 of the conduit 102, as shown in FIGS. 4–7, which increase the resistance to flow of the crushed fibers 100 and other waste material through the conduit 102. Other useful flow restrictions include dies or irregularities such as ridges, rifling counter to the direction of rotation of the screw and roughening of the interior surface 112 of the conduit 102. The use of protrusions 114 or irregularities in the interior surface 112 can provide adequate resistance to flow using a shorter conduit 102.

Figure 4:
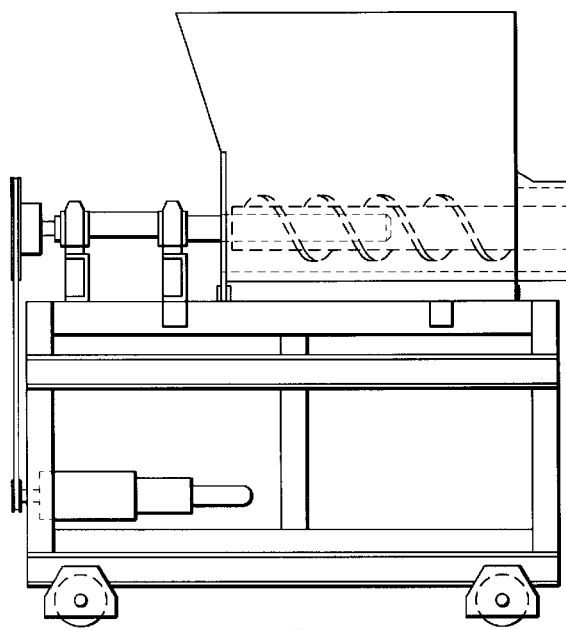
FIG. 4 is a side elevational view of the preferred auger crusher including an alternative embodiment of a pressurizing device which is useful in the present waste material processing system, in accordance with the present invention.
Figure 5:
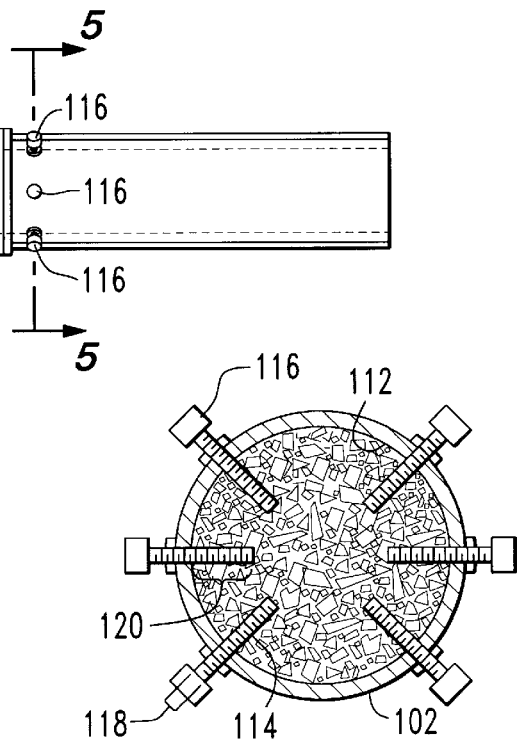
FIG. 5 is a cross-sectional view a portion of the alternative embodiment of the pressurizing device of FIG. 4, taken along lines 5—5 of FIG. 4, in accordance with the present invention.

Referring now to FIGS. 4 and 5, in an alternative embodiment the interior surface 112 of the conduit 102 can comprise one or more protrusions 114 such as screws or bolts 116 which provide increased resistance to flow of the crushed glass fibers 100 and other waste material through the conduit 102. Each screw or bolt 116 can have a width 118 of about 0.006 to about 0.075 meters (about 0.25 to about 3 inches) and a length 120 within the conduit of about 0.006 to about 0.2 meters. Preferably, the number of bolts 116 used as protrusions 114 can be about 1 to about 10, and is preferably 6, although the number and dimensions of the bolts 116 can vary based upon such factors as the dimensions of the conduit 102, bolts 116 and the desired resistance to flow of the waste material. The bolts 116 are preferably evenly spaced about the circumference of the conduit 102, although the bolts 116 can be spaced at any position desired.

Figure 6:
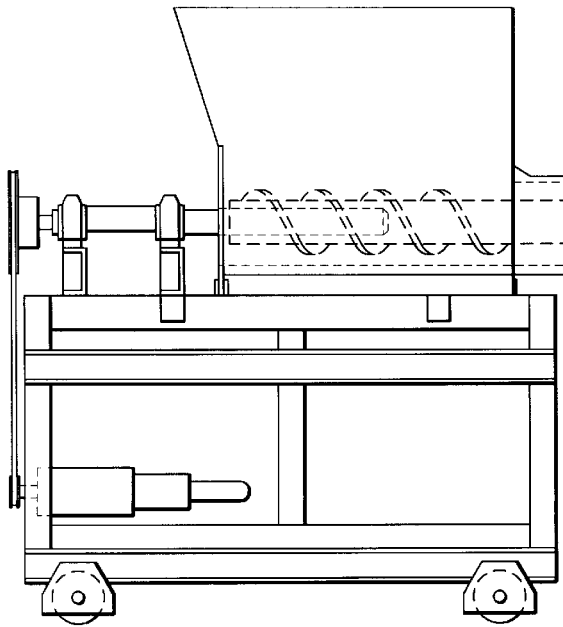
FIG. 6 is a side elevational view of the preferred auger crusher having another alternative embodiment of a pressurizing device which is useful in the present waste material processing system, in accordance with the present invention.
Figure 7:
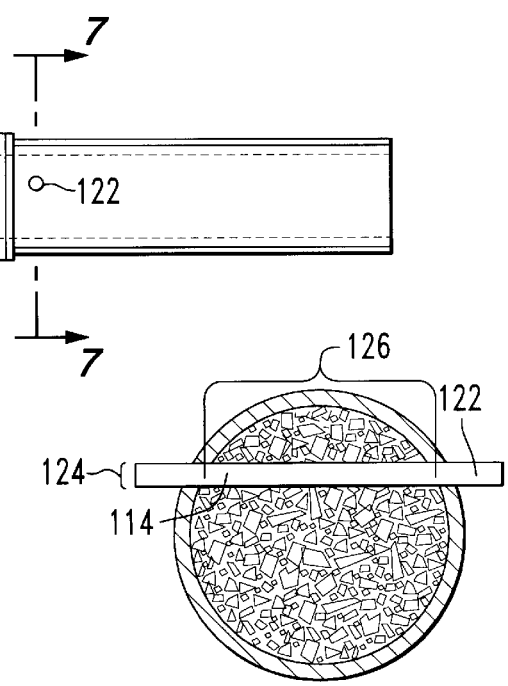
FIG. 7 is a cross-sectional view of the pressurizing device of FIG. 6, taken along lines 7—7 of FIG. 6, in accordance with the present invention.

Referring now to FIGS. 6 and 7, in another alternative embodiment the protrusion 114 can be one or more rods 122. Each rod 122 can have a width 124 of 0.006 to about 0.075 meters (about 0.25 to about 3 inches) and an average length 126 within the conduit of about 0.25 to about 0.55 meters. Preferably, the number of rods 122 used as protrusions 114 can be about 1 to about 10, and is preferably 1, although the number and dimensions of the rods 122 can vary based upon such factors as the dimensions of the conduit 102 and the desired resistance. The rods 122 can be positioned within the interior of the conduit 102 as desired.

Figure 8:
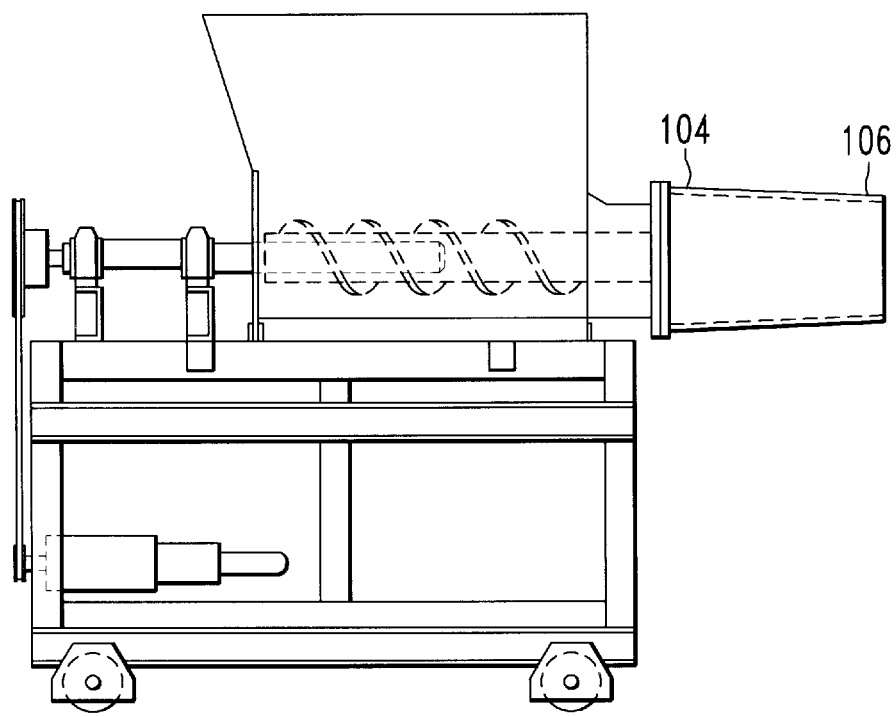
FIG. 8 is a side elevational view of the preferred auger crusher having another alternative embodiment of a pressurizing device which is useful in the present waste material processing system, in accordance with the present invention.

Referring now to FIG. 8, in another alternative embodiment, the diameter 110 of the conduit 102 can be greater at the first end 104 of the conduit 102 than at the second end 106 of the conduit 102. The diameter 110 can be decreased uniformly along the length of the conduit 102 or by one or more progressions, as desired. For example, if the diameter of the conduit 102 at the first end 104 is about 0.35 meters (about 14 inches), the diameter at the second end 106 of the conduit 102 can be about 0.2 meters (about 8 inches).

The pressure exerted by the pressurizing device 94 of the crusher 50 upon the portion 96 of the moisture-reduced waste material 42 positioned about the second end 78 of the auger 72 can range from about $1.38 \times 10^4$ to about $5.51 \times 10^6$ pascals (about 2 to about 800 pounds per square inch), and preferably ranges from about $1.38 \times 10^4$ to about $1.03 \times 10^6$ pascals (about 2 to about 150 pounds per square inch).

In an alternative embodiment shown in phantom in FIG. 1, the moisture-reduced waste material 42 can be pulverized in a pulverizer 51 for pulverizing a major portion of the moisture-reduced waste material 42 into pulverized waste material having a mean average length of less than about 20 mesh, and preferably between about 20 mesh and about 60 mesh. Non-limiting examples of suitable pulverizers include ring roller mills, hammer mills, grinding mills, rotary mills, ball mills, vibratory mills and pin mills such as are disclosed in the *Chemical Engineers' Handbook* at pages 8–33 through 8–40, which are hereby incorporated by reference. Non-limiting examples of suitable pulverizers include the SIMPACTOR® rotary mills which are commercially available from Sturtvant of Boston, Mass. and the Buffalo WA Series vibratory mills which are commercially available from Hammer Mill Corp. Of Buffalo, N.Y.

Referring now to the preferred embodiment shown in FIG. 1, the waste material processing system 10 can further comprise a metal detector and removal device 128 positioned between the crusher 50 and the dryer 130 for removing contaminants such as metallic material and graphite from the moisture-reduced waste material. Suitable metal detector and removal systems are well known to those skilled in the art and include metal detectors which determine the presence of metallic materials by fluctuations in the spatial location and amplitude in a field of fixed frequency which can be generated using an inductor of fixed inductance and a capacitor of fixed capacitance. A non-limiting example of a suitable metal detector 128 is E-Z Tech Model III synchro magnetic detector, which is commercially available from Eriez Manufacturing Co. of Erie, Pa. The contaminants can be removed or separated from the waste material 14 by a diverter, slot or gate in the conveyor 24 which is opened in response to a signal received from the metal detector 128, for example.

The waste material processing system 10 can further comprise a coarse waste material separating device 132 positioned between the crusher 50 and the dryer 130. The coarse waste material separating device 132 receives the moisture-reduced waste material 42 including crushed glass fibers 100 from the crusher 50 and separates (1) waste material 134 having a dimension 136, such as length or width, less than about 0.025 meters (about 1 inch) and preferably between about 0.01 to about 0.025 meters (about 0.5 to about 1 inches) from (2) coarser waste material 138. Non-limiting examples of such coarse waste material 138 include pieces of forming packages, forming tubes, graphite gathering shoes and refractory materials from the glass melter. Typically, the coarse waste material 138 comprises about 1 to about 10 weight percent of the waste material 14.

The separating device 132 is preferably a screening device 140 such as is shown in FIG. 1. Preferably the screening device 140 does not lift the crushed waste material vertically to prevent coarser waste material 136 from reorienting such that the length of the coarse waste material 136 is generally perpendicular to the plane of the screen and which can permit coarser waste material 136 to pass the screen.

Useful screening devices 140 include mechanical shaking screens and vibrating screens such as are disclosed in R. Perry et al., *Chemical Engineers' Handbook*, (5th Ed. 1973) at pages 21–39 through 21–45, which are hereby incorporated by reference. The preferred screening device 140 is a scalping vibratory screener having 0.025 meter (one inch) opening wire cloth screen such as a Series 80 screener with a DX 2000 counterbalanced drive which is commercially available from Rotex of Cincinnati, Ohio and such as are available from Heyl & Patterson, Inc. of Pittsburgh, Pa. and S. Howles of Silver Creek, N.Y.

The preferred waste material processing system 10 which comprises the auger crusher 50 discussed above can further comprise a pulverizer 142, if necessary. The pulverizer 142 preferably reduces the size of the waste material 134 to about 20 to about 200 mesh and more preferably about 20 to about 50 mesh. Suitable pulverizers are discussed above.

The waste material processing system 10 comprises one or more dryers 130 positioned to receive the moisture-reduced waste material 42 from the crusher 50 (or metal removal device 128 and/or screening device, if present). The dryer 130 drys the moisture-reduced waste material 42 to form dried waste material 144 having a mean average moisture content of less than about one weight percent, and preferably about 0.3 to about 0.5 weight percent moisture on a total weight basis. Preferably the dryer 130 is combined with one or more cooling devices 146 for cooling the dried waste material 144 received from the dryer.

The dryer 130 preferably drys the waste material 15 by exposure to heated air at a temperature ranging from about 120° C. to about 815° C. (about 250° F. to about 1500° F.), and more preferably about 205° C. to about 500° C. (about 400° F. to about 925° F.). The time period for drying preferably ranges from about 5 to about 30 minutes, and more preferably about 7 to about 15 minutes. Preferably the dried waste material 144 is cooled to about 25° C. upon exiting the cooler 146.

Suitable dryers 130 can be selected from rotary dryers (preferred), fluidized bed dryers, forced air dryers, infrared dryers, radio frequency dryers, hot air resistance dryers and other suitable direct fired dryers for glass fibers which are well known to those skilled in the art. Non-limiting examples of useful dryers 130 include Rotor-Louvre Precision dryers/coolers which are commercially available from FMC Corporation of Chalfont, Pa. and rotary calciners/coolers which are commercially available from Heyl & Patterson, Inc.

As shown In FIG. 1, the waste material processing system 10 can further comprise one or more baghouses 190 for separating and recovering fine dried waste material 144 from the air stream 192 received from the dryer 130. Suitable baghouses are well known to those skilled in the art and are commercially available from Nol-Tec Systems Inc. of Forest Lake, Minn. The fine waste material can be recombined with the dried waste material 144 for further processing.

As shown In FIG. 1, the waste material processing system 10 can further comprise one or more secondary crushers 150 positioned to receive dried waste material 144 from the dryer 130 and crush the scrap glass fibers in the dried waste material 144 to form crushed glass fibers 152.

Referring now to FIGS. 9–12, the secondary crusher 150 comprises at least one pair of rotatable, intermeshing rollers 154 and one or more drive devices 156 for rotating at least one of the rollers 154 such that each pair of rollers 154 rotate at essentially the same speed, and preferably the same speed. As used herein, "essentially the same speed" means that that each of the rollers 154 of a pair rotate within about 5 percent of the speed of the other roll of the pair, and preferably less than about 1 percent.

Preferably the rollers 154 are configured to reduce shearing effects upon the fibers to provide fibers having generally smooth ends.

Figure 9:
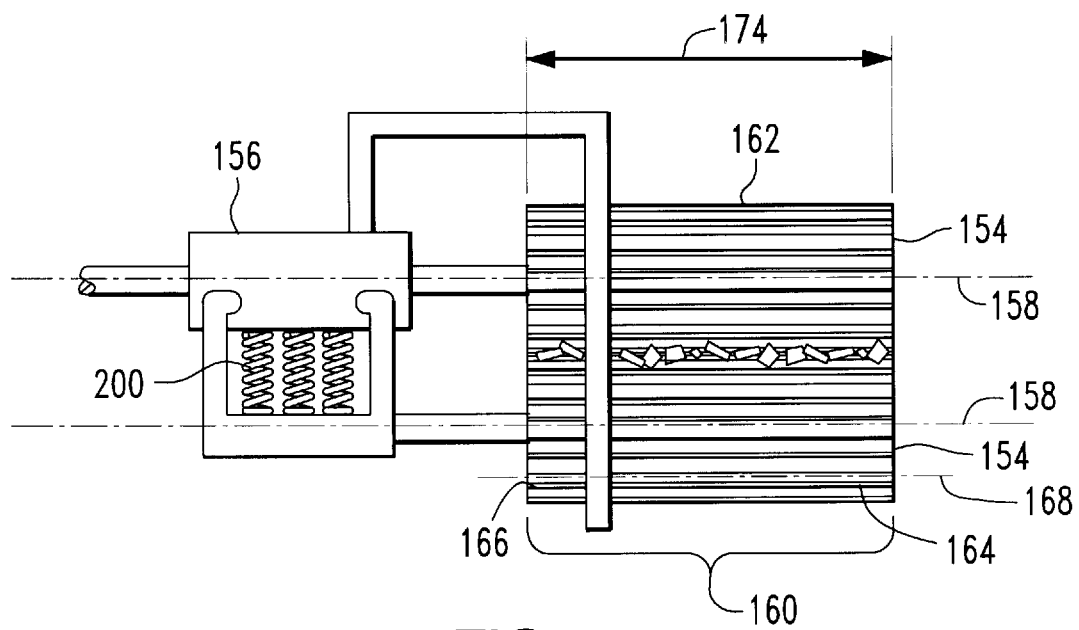
FIG. 9 is a top plan view of a roller crusher which is useful in the present waste material processing system, in accordance with the present invention.

As shown in FIGS. 1 and 11–12, the secondary crusher 150 can comprise a plurality of pairs of intermeshing rollers 154. Preferably the secondary crusher 150 comprises 2 to 4 pairs of rollers 154. Each of the rollers 154 has an axis of rotation 158, the axes of rotation 158 of each pair of rollers 154 preferably being offset, as shown in FIG. 12. In an alternative embodiment, the axes of rotation 158 of each pair of rollers 154 are generally parallel, as shown in FIGS. 9–11.

Preferably, the rollers 154 are formed from a material selected from the group consisting of resilient thermoplastic materials and thermosetting materials, preferably a urethane polymer. Although not preferred, the rollers 154 can be formed from a metallic material such as steel, if desired.

The length 160 of each roller 154 can range from about 0.125 to about 0.75 meters (about 5 to about 30 inches) and preferably about 0.5 to about 0.6 meters (about 20 to about 24 inches). The diameter 162 of each roller 154 can range from about 0.1 to about 0.5 meters (about 4 to about 20 inches) and preferably about 0.2 to about 0.3 meters (about 8 to about 12 inches). The length 160 and diameter 162 of each roller 154 of a pair of rollers can be different, if desired.

Each roller 154 has an outer surface 162 comprising a plurality of protuberances 164 which are essentially free of serrations. As used herein, "essentially free of serrations" means that the outer surface 162 of each roller 154 has less than about 5 percent by surface area, and is preferably free of, serrations having a cross-sectional shape in the form of a pointed tooth. Preferably the rollers 154 of a pair of rollers 154 have about the same pitch.

Preferably, the protuberance 164 is a ridge or corrugation 166 having a longitudinal axis 168 which is generally parallel to the axis of rotation 158 of the roller 154, the edges 170 of the corrugation 166 preferably being generally rounded.

The width 172 of the corrugation 166 can range from about 0.0016 to about 0.025 meters (about 1/16 to about 1 inches), and is preferably about 0.003 to about 0.006 meters (about 1/8 to about 1/4 inches). The length 174 of the corrugation 166 is preferably about the same as the length 160 of the roller 154. One or more ridges 166 can be positioned along the length 160 of the roller 154, as desired. The height 176 of the corrugation 166 is preferably greater than or equal to the width 172 of the corrugation and can range from about 0.0016 to about 0.025 meters (about 1/16 to about 1 inches). The height 176 of the corrugation 166 can vary along the length 160 of the roller 154, as desired. Alternatively, a knurled or smooth surface roll can be used.

At least a portion 178 of a protuberance 164 of a first roller 180 of the pair of rollers 154 contacts a corresponding mating portion 182 of at least one protuberance 164 of a second roller 184 of the pair of rollers 154 for crushing scrap glass fibers 16 passing therebetween to form crushed glass fibers 152. One or more biasing members 200, such as springs or hydraulic cylinders, are used to bias the rollers 180, 184 into contact. Non-limiting examples of suitable air cylinders for biasing the rollers 180, 184 into contact are spring-loaded hydraulic cylinders which are commercially available from Bimba Inc. of Monel, Ill. The biasing force provided by the biasing member 200 should be sufficient to maintain the rollers 180, 184 in contact when crushing glass fibers, but should permit the rollers 180, 184 to separate to permit uncrushable materials such as refractory materials to pass therethrough.

The waste material processing system 10 comprises one or more separating devices 186 positioned to receive the dried waste material 144 from the dryer 130 (or the secondary crusher 150, if present). The separating device 186 separates the dried waste material 144 into a first portion 188 of dried waste material 144 having a mean average dimension, i.e., length and width, of less than about 5 millimeters from oversized dried waste material 194. Typically, the first portion 188 of dried waste material 144 comprises about 80 to about 90 weight percent of the dried waste material 144.

The separating device 186 can be one or more screening devices, mills and/or air classifiers. The separating device 186 is preferably two screening devices 196 and 198, respectively, such as are shown in FIG. 1. Preferably the screening devices 196,198 do not lift the dried waste material 144 vertically to prevent oversize waste material 194 from reorienting such that the length of the oversize waste material 194 is generally perpendicular to the plane of the screen which can permit oversize waste material 194 to pass through the screen.

Useful screening devices 196,198 include mechanical shaking screens and vibrating screens such as are discussed above. The preferred screening devices 196,198 are scalping vibratory screeners such as Series 80 screeners with a DX 2000 drive which are commercially available from Rotex. The first screening device 196 preferably has about 0.005 to about 0.02 meters (about 3/16 to about 3/4 inch), and more preferably about 0.006 meters (1/4 inch) opening wire cloth screen and the second screening device 198 preferably has about 0.0008 to about 0.005 meters (about 1/32 to about 3/16 inch), and more preferably about 0.003 meters (1/8 inch) opening perforated plate when the screened material is to be pneumatically conveyed. The openings can be slightly larger, i.e., about 0.006 meters (1/4 inch) if the material is to be mechanically conveyed.

In an alternative embodiment shown in FIG. 2, dried waste material 444 received from the dryer 430 can be pulverizer using a pulverizer 400 such as are discussed in detail above. The pulverized material 402 can be passed through a metal detector and removal system 404 to remove metallic materials and graphite and transported to a storage bin 406 for recycling to the glass melter 420 as discussed below.

As shown in FIG. 1, the preferred system 10 can further comprise one or more pneumatic transports 201. The pneumatic transport 201 is preferably a batch-loaded, dense phase transport system capable of transporting loads of about 0.5 metric tons (about 1000 pounds) such as are commercially available from Nol-Tec Systems, Inc. and Dynamic Air of St. Paul, Minn. and as are disclosed in Loewenstein at pages 45–46, which are hereby incorporated by reference.

The system 10 can also further comprise a metal detector and removal system 203 positioned to receive the first portion 188 of dried waste material from the separating device 186 and detect and remove metallic materials and graphite from therefrom. Suitable metal detector and removal systems are discussed in detail above.

As shown in FIG. 1, the system 10 can further comprise one or more air separating devices 202 positioned to receive the first portion 188 of dried waste material from the separating device 186 (and the metal detector and removal system 203, if present) which is suitable for conveying to the glass melter 20. The air separating device 202 separates a portion 204 of crushed glass fibers 240 having a mean average length of less than about 5millimeters (about 3/16 inches), and preferably between about 0.0008 and about 0.003 millimeters (about 1/32 to about 1/8 inches) from a second portion 206 of oversize glass fibers and other waste material. The portion 204 is preferably sized such that it can be pneumatically transferred to a storage bin 226 by a pneumatic air transport such as are discussed in detail above.

Preferably, the air separating device 202 subdivides the second portion 206 of oversize glass fibers and other waste material into heavy, non-glass waste 208 which is discarded and oversize glass fibers, glass beads and frit materials 210 which can be screened by a metal detector and removal device 212 (such as are discussed above). The fines 214 entrained in the air stream can be recovered by passing the air stream 216 through a baghouse 218, examples of which are discussed in detail above.

The separation of the different fractions of waste material depend upon such factors as the air velocity, particle size, configuration, weight and inertia. By varying the air velocity, configuration and number of separation chambers or separating devices, the grouping of desired fractions can be achieved. Preferably, the air velocity within an uplift air separating device 202 can be about 0.6 to about 60 meters per second (about 2 to about 200 feet per second), and is preferably about 6 to about 48 meters per second (about 20 to about 160 feet per second) and more preferably about 39 to about 45 meters per second (about 130 to about 150 feet per second).

Figure 13:
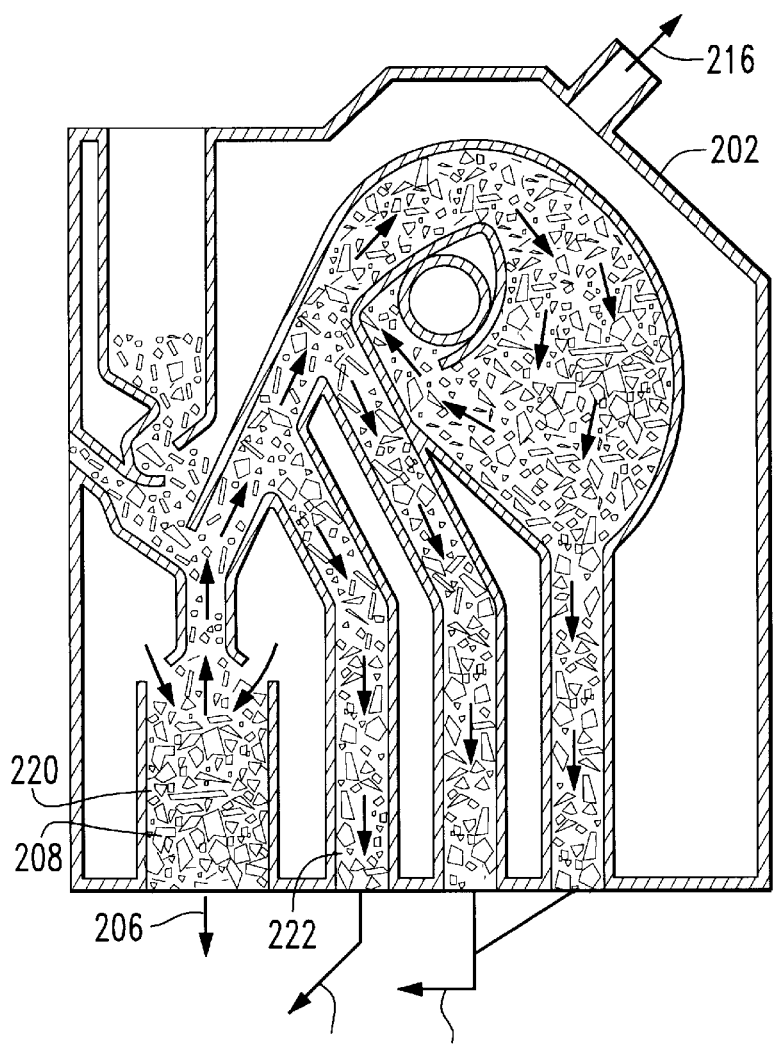
FIG. 13 is a schematic diagram of a preferred air separating device which is useful in the present waste material processing system, in accordance with the present invention.

The air separating device 202 is preferably an uplift air separator, such as is shown generally in FIG. 13. Examples of suitable uplift air separators are Models CEX2 and CEY2 fractionating aspirators which are commercially available from Carter Day of Minneapolis, Minn. The attached blower can be powered by any conventional motor such as are discussed above, for example a 5 horsepower motor such as are commercially available from Baldor. The CEY2 air separator has a 1.2 meter (48 inch) wide air/material contact width and three product collection chambers which permit collection of several fractions of product. See "Carter Day Fractionating Aspirator 24" & 48" Instruction Manual", Carter Day (Minneapolis, Minn.)

Preferably, the first collection chamber 220 separates and accumulates dried waste material 144, such as cardboard forming package tubes, which is larger than about 16 mesh, and more preferably about 20 mesh. This waste material 208 is preferably discarded.

The second collection chamber 222 separates and accumulates dried waste material 144 which is ranges from about 16 to about 65 mesh, and more preferably about 20 to about 60 mesh. This oversize waste material 210 can be treated with a lubricant such as water and passed through a mill or pulverizer 224 such as are discussed above and a second air separating device 228.

One skilled in the art would understand that the number of collection chambers can be varied as desired, and the portion of waste material being diverted to a particular chamber can be influenced by such factors as the air velocity within and the configuration of the air separating device 202.

Figure 14:
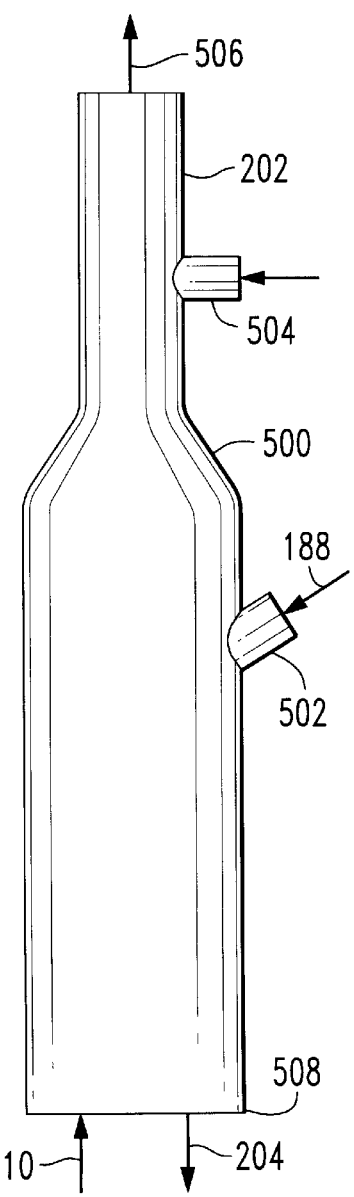
FIG. 14 is a schematic diagram of an alternative embodiment of an air separating device which is useful in the present waste material processing system, in accordance with the present invention.
Figure 15:
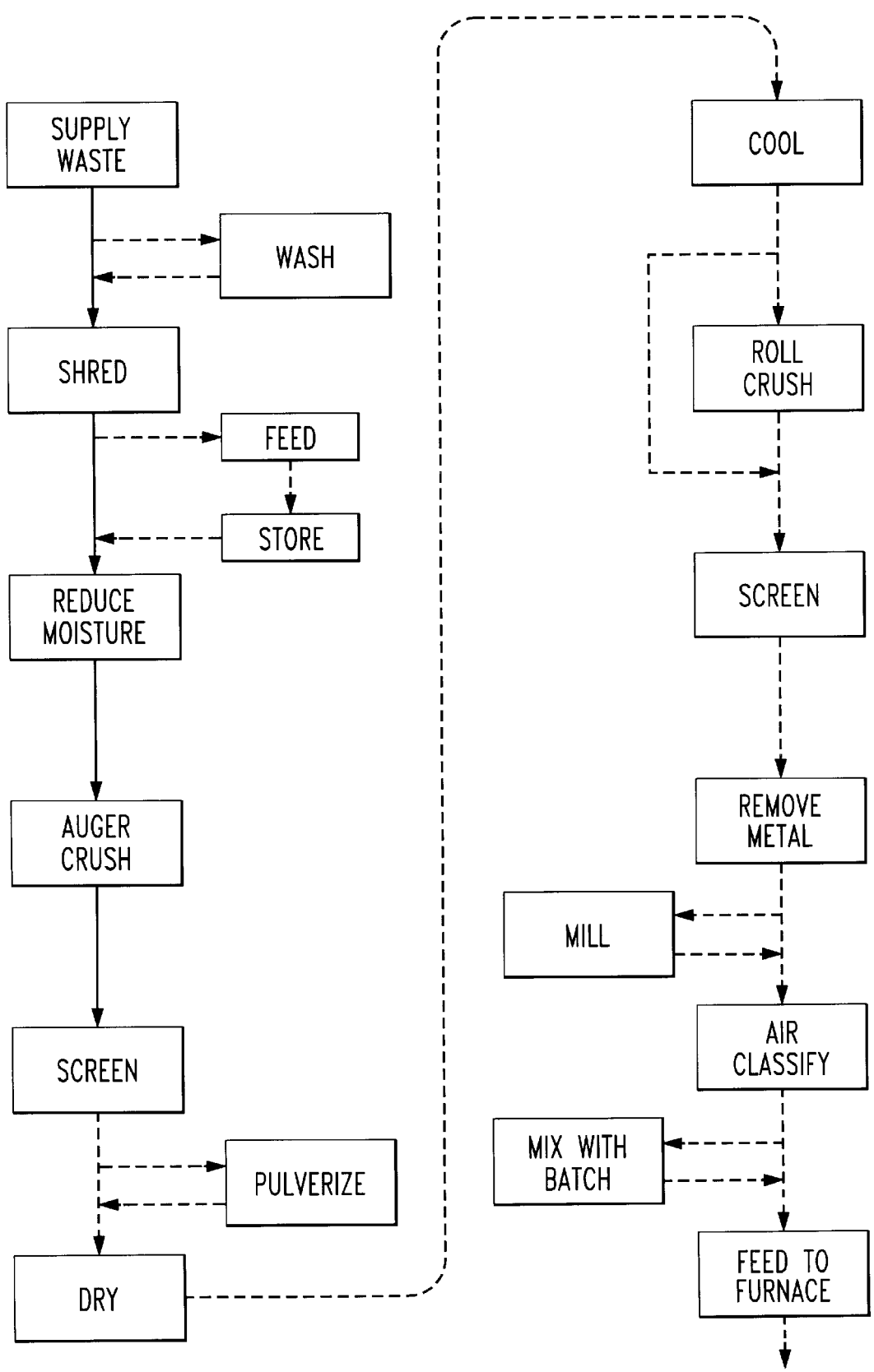
FIG. 15 is a flow diagram of a preferred process for recycling waste material including alternative and additional steps, in accordance with the present invention.

Alternatively, the air separating device 202 can be a series of cyclone separators or tapered pipes (shown in FIG. 14), each pipe 500 having a first side entry inlet 504 for regulating air, a main air bottom inlet 510 and a second side entry inlet 502 below the air inlet 504 for receiving the first portion 188 of dried waste material from the separating device 186. The light fraction is entrained by the airstream and exits the top 506 of the pipe 500 and the portion 204 of crushed glass fibers exits from the bottom 508 of the pipe 500. Other useful air separating devices or air classifiers are disclosed in the *Chemical Engineers' Handbook* at pages 8–31 through 8–32, which are hereby incorporated by reference.

The crushed glass fibers 240 in the storage bin 226 can be transported by a pneumatic transport 230 to another storage bin 232 in the batch house (not shown). The crushed glass fibers can be mixed with batch materials 234 in a blender 236 and fed by a feeder 242 to the glass melter 20 or directly to the glass melter 20 as a separate batch ingredient. The blender 236 can be a conventional mixer for glass fibers which are well known to those skilled in the art, such as are commercially available from Nol-Tec Systems, Inc. and as are disclosed in Loewenstein at pages 45–46. Suitable feeders 242 for glass fibers include loss-in-weight feeders and the auger feeder disclosed in U.S. Pat. No. 5,352,258 at column 6, line 64 through column 7, line 25 and column 11, lines 5–38, which are hereby incorporated by reference. Other suitable feeders are well known to those skilled in the art.

Alternatively, the crushed glass fibers can another glass melter 238 which operates on 100 percent recycled scrap glass.

The recycled waste material is useful as an ingredient in a glass fiberizing or forming operation 316, shown in FIG. 16. In a typical glass fiber forming operation, particulate batch materials of from less than about 325 to about 100 mesh (U.S. sieve series) are mixed, melted in a glass furnace or melter 20, 238 and drawn into glass fibers 318.

The glass melter 20, 238, also referred to as a glass furnace or forehearth, contains a supply of molten glass 320 and has a precious metal bushing 306 or spinneret attached to the bottom of the glass melter 20. The bushing 306 is provided with a series of orifices in the form of tips 322 through which molten glass 320 is drawn in the form of individual fibers 318 or filaments at a high rate of speed.

The glass fibers 318 can be cooled by spraying with water (not shown) and then coated with a sizing composition by an applicator device 324 which contacts the fibers 318 prior to entering the alignment device 326. Examples of suitable applicator devices are disclosed in Loewenstein at pages 165–172, which are hereby incorporated by reference. Non-limiting examples of suitable alignment devices 326 include rotatable or stationary gathering shoes or a comb, as discussed in Loewenstein at page 173, which is hereby incorporated by reference.

Referring to FIG. 16, the fiber forming operation 316 also comprises a winder 328 for receiving the fiber strands 330 from the alignment device 326, advancing and applying a tension to the strands 330, and forming the strands 330 into a wound forming package 304.

The process according to the present invention for processing waste material for recycling will now be described generally.

With reference to FIG. 16, the process generally comprises the initial step of supplying waste material 14 to a shredder 30. The waste material 14 can be washed by a washer 28, as discussed above, to remove at least a potion of any coatings upon the glass fibers and other waste material.

The next step in the process involves shredding the glass fiber waste material 14. The shredded waste material 34 can be stored in a storage system 36, for example when one or more of the components of the system 10 is not properly operating.

The moisture in the shredded waste material is reduced by using a moisture-reducing or dewatering device as discussed above to form moisture-reduced waste material. The moisture-reduced waste material is crushed in an auger crusher 50, such as is discussed in detail above, by feeding the moisture-reduced waste material into the feed chute and first end 62 of the cavity 60 and through the auger crusher 50 having a pressure device such as conduit 102 connected thereto to apply backpressure to the material advancing through the auger crusher 50 sufficient to crush the glass fibers in the moisture-reduced waste material.

The crushed glass fibers and waste material is separated by a separating device, such as one or more screeners, into coarse waste material and screened recyclable glass fibers, for example by shaking the screens.

If the screened glass fibers are still too large for proper recycling after screening, the glass fibers can be pulverized. The screened or pulverized glass fibers can be dried in a dryer 50, cooled and, if necessary, crushed in a secondary crusher 150 as discussed above. Alternatively or additionally, the glass fibers can be rescreened using a finer mesh screen to separate and recover smaller glass fibers.

After removing any metal or graphite from the smaller glass fibers, they can be milled and/or air classified to further reduce or capture a desired fraction having a smaller average particle size. The suitable fraction of glass fibers can be conveyed pneumatically to storage bins, a blender for blending with other batch materials or directly to a glass melter.

The operation of the waste processing system 10 to perform the process according to the present invention will now be described. However, other systems than that shown and described herein could be used to perform the process of the present invention, if desired.

In the initial sequence of operation of the preferred embodiment, waste material 14 is gathered as discussed above and supplied by a conveyor 24 to a shredder 30. Preferably, the waste material 14 is washed by water as it is conveyed to remove at least a portion of any coating compositions thereon.

The shredder 30 is activated to shred waste material 14 passing therethrough. If necessary, the shredded waste material 34 can be conveyed to a storage system 36 such as a floor bunker and returned to the system 10 by a feeder as discussed above. The shredded waste material 34 is conveyed to an activated dewatering device 40 which removes excess moisture from the shredded waste material 34 to form moisture-reduced waste material 42.

The moisture-reduced waste material 42 is conveyed to the activated auger crusher 50 and crushed as discussed above. The crushed glass fibers 100 and other waste material are screened using a 1 inch opening stainless steel mesh vibrating screen to separate coarse waste material 138 from smaller waste material which pass through the screen.

The dryer 130 preferably drys the waste material 15 by exposure to heated air at a temperature ranging from about 120° C. to about 815° C. (about 250° F. to about 1500° F.), and more preferably about 205° C. to about 500° C. (about 400° F. to about 925° F). The time period for drying preferably ranges from about 5 to about 30 minutes, and more preferably about 7 to about 15 minutes. Preferably the dried waste material 144 is cooled to about 25° C. upon exiting the cooler 146.

The dried waste material 42 can be crushed in a secondary crusher 150 preferably having 3 pairs of rollers 154 as discussed in detail above. The crushed glass fibers and waste material not previously separated are screened through a series of vibrating screeners, the first screener having a 0.006 meter (¼ inch) opening stainless steel mesh screen and the second screener having a 0.003 meter (⅛ inch) opening stainless steel perforated plate to separate oversize dried waste material 194 from glass fibers and waste material which pass through the screens.

A metal detector and removal system 212 can activated to separate metallic and graphite materials from the glass fibers and waste material which passed through the 0.006 meter (¼ inch) and 0.003 meter (⅛ inch) screens.

After removing any metal or graphite, the residual glass fibers and waste material can be milled and/or air classified to further reduce or capture a desired fraction having a smaller average particle size. The suitable fraction of glass fibers can be conveyed pneumatically to storage bins, a blender for blending with other batch materials or directly to a glass melter, as discussed above.

The process and system 10 of the present invention will now be illustrated by the following specific, non-limiting examples.

EXAMPLE 1

About 0.27 metric tons (about 600 pounds) of waste material from an E-glass fiber forming operation was processed in the following manner. The waste material was then shredded into lengths ranging from about 1.5 meters (about 5 inches) to about 3.6 meters (about 12 inches) using a SSI Model 3400H shredder having two prongs per cutting head, as discussed above. The waste material was stacked into a pile and drained at a temperature of about 25° C. for about 4–5 days, such that the drained waste material had about 4 to about 5 weight percent moisture on a total weight basis.

The drained shredded waste material was fed into an auger crusher having a cavity which was about 1.45 meters (about 58 inches) long and about 0.75 meters (about 30 inches) deep. The auger in the crusher was about 1.4 meters (about 56 inches) long, had a shaft diameter of about 0.075 meters (about 3 inches), a 0.55 meter (22 inch) right handed pitch at the first end and a 0.4 meter (16 inch) pitch at the second end thereof, a flight width of about 0.04 meters (about 1.5 inches) and an outer diameter of about 0.25 meters (about 9 inches). The flights were coated with STOOL 101 alloy as discussed above.

A standard 0.25 meter (10 inch) long extension having about a 0.25 meter (10 inch) diameter was attached to the second, discharge end of the cavity proximate the second end of the auger. Conduits of varying lengths, set forth in Table 1, were attached to the discharge end of the extension.

TABLE 1

| CONDUIT LENGTH | |
|---|---|
| METERS | FEET |
| 0.9 | 3 |
| 1.8 | 6 |
| 3 | 10 |
| 4.5 | 15 |
| 5.1 | 17 |

The auger was rotated at a speed of about 7 revolutions per minute using a Baldor 5 horsepower motor. It was observed that the mean particle size of the waste material was reduced as the length of the conduit was increased. No noticeable reduction in mean particle size from the feed waste material was observed when only the standard 0.25 meter (10 inch) batch feeder extension was attached to the crusher.

EXAMPLE 2

The crushed waste material produced using the 1.8 meter (6 foot) conduit attached to the auger crusher was conveyed through an 0.45 meter (18 inch) screw auger conveyor at about a 45° angle to horizontal. The crushed waste material was screened using a 1 inch opening stainless steel mesh vibrating screen to separate coarse waste material from smaller waste material which passed through the screen.

The smaller waste material was passed through a Carter Day Model CEY2 fractionating aspirator (air classifier) at an air velocity of about 40.5 to about 45 meters per second (about 135 to about 150 feet per second). The damper was set to setting number 4 and the flange was set to setting number 5. The feeder roll was not used.

The air classifier had three product collection chambers, one oversize material collection port and a fines removal port. The material collected in the three center chambers of the air classifier was consolidated. This material was screened using a 0.006 meter (¼ inch) opening stainless steel mesh and 0.003 meter (⅛ inch) vibrating screens to separate oversize waste material from acceptable waste material which passed through the screens. The coarse material was recirculated through a 0.006 meter (¼ inch) opening stainless steel mesh screen and through a secondary crusher having a pair of 0.1 meter (4 inch) long and 0.09 meter (3.5 inch) diameter intermeshed rollers having 18 rounded corrugations along the length of each roll, as discussed above. One roller was rotated by a drive at a speed of about 90 revolutions per minute. The crushed waste material was recirculated through the 0.025 meter (1 inch) opening screen and the air classifier. About 440 kilograms (about 200 pounds) of acceptable waste material which passed through the 0.003 meter (⅛ inch) opening screen was collected and samples of which were analyzed.

The loss on ignition (LOI) of the first sample was determined to be 0.35 mass weight percent.

Figure 18:
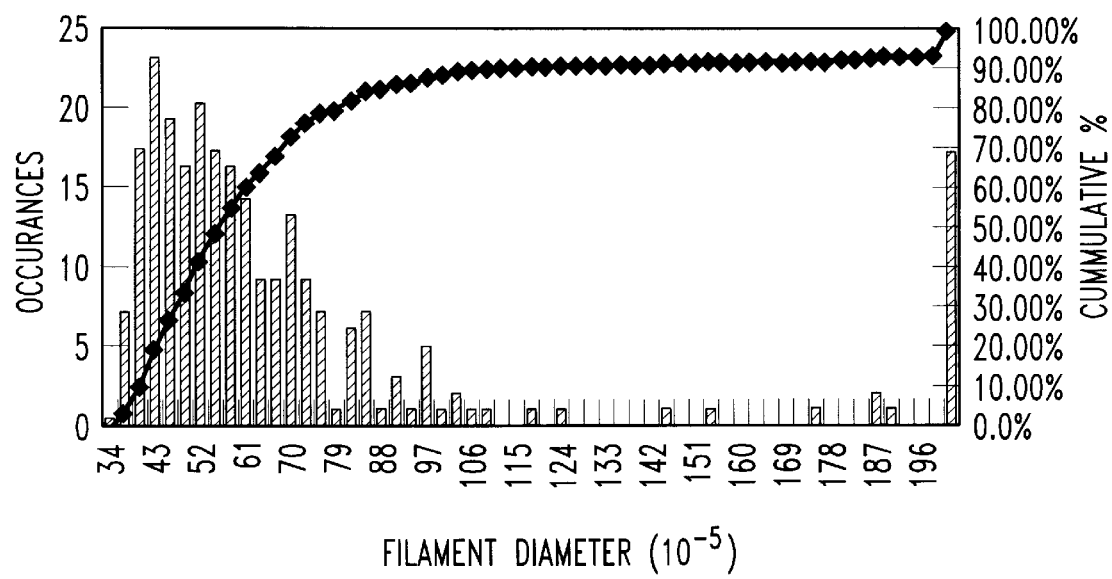
FIG. 18 is a bar chart of number of occurrences of specified filament diameters of glass fibers in a sample.

FIG. 18 is a bar chart of number of occurrences of specified fiber lengths in a 250 count fiber sample and FIG. 19 is a bar chart of number of occurrences of specified filament diameters in a 250 count fiber sample as determined by transmitted light optical microscopy using the commercially available OPTIMAS image analysis package.

The average fiber diameter was determined to be $1.94 \times 10^{-5}$ meters ($77.6 \times 10^{-5}$ inches). The filament diameter ranged from $8.5 \times 10^{-6}$ meters ($34 \times 10^{-5}$ inches) to $1.1 \times 10^{-4}$ meters ($427 \times 10^{-5}$ inches). Fifty percent of the fibers had diameters of less than $1.4 \times 10^{-5}$ meters ($56 \times 10^{-5}$ inches).

The average fiber length was determined to be $6.5 \times 10^{-4}$ meters (0.026 inches). The filament diameter ranged from $7.5 \times 10^{-5}$ meters (0.003 inches) to $3.2 \times 10^{-3}$ meters (0.127 inches). Fifty percent of the fibers had diameters of less than $5 \times 10$–4 meters (0.020 inches). The aspect ratio of the average fiber length to diameter was 33.

Approximately 500 milliliters of a second sample of the collected material was placed onto a U.S.A. series sieve having 2 millimeter (mm) openings and over a stack of five additional screens having successively smaller openings as follows: 1 mm, 0.5 mm, 0.25 mm, 0.15 mm and 0.075 mm and a collection pan. The set of six screens was vigorously shaken for about five minutes and disassembled. The material trapped on each screen and the collection pan was collected and weighed. The results of this analysis are shown in Table 2 below.

TABLE 2

| SCREEN OPENING (mm) | WEIGHT PERCENTAGE OF SAMPLE |
| --- | --- |
| 2.0 | 0.2 |
| 1.0 | 0.2 |
| 0.5 | 7.4 |
| 0.25 | 56.6 |
| 0.15 | 22.0 |
| 0.075 | 13.0 |
| <0.075 | 0.6 |

The loss on ignition (LOI) of the second sample was determined to be 0.0 mass weight percent. The second sample had 0.1 weight percent moisture, 0.3 weight percent organics and 0.4 weight percent volatiles. The percent moisture was calculated as the percent mass loss upon heating at 110° C. overnight (about 8–10 hours). The volatiles were calculated as the percent mass loss upon heating at 650° C. and the percent organics was calculated as the difference between the percent volatiles and the percent moisture.

The bulk density (natural fill) of the second sample was determined to be 0.985 grams per cubic centimeter. The natural fill bulk density was determined by pouring the sample into a 50 milliliter graduated cylinder to the 50 milliliter level. The bulk density (tamped) of the second sample was determined to be 1.248 grams per cubic centimeter. The tamped bulk density was determined by pouring the sample into a 50 milliliter graduated cylinder and tamping the cylinder until the material settled to the 50 milliliter level. According to ASTM Method E688, the sample displayed incomplete flow.

From the foregoing description, it can be seen that the present invention provides a simple, economical, durable system and process for reducing waste disposal costs and increases efficiency and productivity. The resulting glass fiber product can have relatively smooth ends, low surface organic levels and can be readily pneumatically transported to facilitate recycling of the product to the glass melter. The system and process of the present invention also provide the capability to consolidate waste from different glass fiber forming facilities.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A waste material processing system comprising:
    (a) a waste material supply comprising waste material produced by a glass fiberizing process and comprising scrap glass fibers;
    (b) a shredder positioned to receive waste material from the waste material supply, the shredder for shredding the waste material to form shredded waste material;
    (c) a moisture reducing device positioned to receive shredded waste material from the shredder, the moisture reducing device for reducing the mean average moisture content of the shredded waste material to form moisture-reduced waste material;
    (d) a crusher comprising:
        (1) a body comprising a cavity having a first end positioned to receive the moisture-reduced waste material from the moisture reducing device, a second end distal to the first end, and a length therebetween;
        (2) a rotatable screw auger positioned within the cavity of the body for crushing and conveying the moisture-reduced waste material from the first end of the cavity in a first direction toward the second end of the cavity, the auger having a first end proximate the first end of the cavity, a second end proximate the second end of the cavity, and a length therebetween; and
        (3) a pressurizing device for exerting a pressure ranging from about $1.38 \times 10^4$ to about $5.51 \times 10^6$ pascals upon at least a portion of the moisture-reduced waste material positioned about the second end of the auger in a direction generally opposite to the first direction in which the auger conveys the moisture-reduced waste material such that the portion of the scrap glass fibers in the moisture-reduced waste material is crushed to form crushed glass fibers;
    (e) a dryer positioned to receive the moisture-reduced waste material from the crusher, the dryer for drying the moisture-reduced waste material to form dried waste material having a mean average moisture content of less than about one weight percent; and
    (f) a separating device positioned to receive the dried waste material from the dryer, the separating device for separating the dried waste material into a first portion of dried waste material having a mean average length of less than about 5 millimeters from oversized dried waste material.

2. The system according to claim 1, wherein the mean average length of the scrap glass fibers of the shredded waste material ranges from about 0.05 to about 0.3 meters.

3. The system according to claim 1, wherein the mean average moisture content of the moisture-reduced waste material ranges from about 5 to about 30 weight percent moisture based upon a total weight basis.

4. The system according to claim 1, wherein the moisture reducing device is selected from the group consisting of dewatering devices, dryers, presses and calciners.

5. The system according to claim 1, wherein the length of the cavity ranges from about 0.6 to about 1.8 meters.

6. The system according to claim 1, wherein the cavity has an mean average width ranging from about 0.25 to about 1.25 meters.

7. The system according to claim 1, wherein the length of the auger ranges from about 0.5 to about 1.75 meters.

8. The system according to claim 7, wherein the auger has a flight having a plurality of peaks along the length of the auger, the distance between adjacent peaks ranging from about 0.35 to about 0.6 meters.

9. The system according to claim 8, wherein the flight is positioned at an angle ranging from about 80 to about 100 degrees with respect to a longitudinal axis of rotation of the auger.

10. The system according to claim 1, wherein the auger has an outer diameter ranging from about 0.2 to about 0.4 meters.

11. The system according to claim 1, wherein the pressurizing device is a conduit comprising a first end positioned adjacent to the second end of the cavity for receiving moisture-reduced waste material from the second end of the cavity, a second end and a length therebetween, such that a first portion of the crushed glass fibers received from the second end of the cavity accumulates within the conduit to exert the pressure upon at least the portion of the moisture-reduced waste material positioned about the second end of the auger in the direction generally opposite to the first direction in which the auger conveys the moisture-reduced waste material to provide resistance to the flow of the portion of the moisture-reduced waste material being conveyed through the cavity and conduit such that the major portion of the scrap glass fibers in the moisture-reduced waste material are crushed by the second end of the auger to form the crushed glass fibers.

12. The system according to claim 11, wherein the length of the conduit ranges from about 0.9 to about 6 meters.

13. The system according to claim 11, wherein the internal diameter of the conduit ranges from about 0.15 to about 0.6 meters.

14. The system according to claim 11, wherein the diameter of the conduit is greater at the first end of the conduit than at the second end of the conduit.

15. The system according to claim 11, wherein the conduit has an interior surface which comprises at least one protrusion into the interior of the conduit.

16. The system according to claim 1, wherein the separating device is selected from the group consisting of screening devices, mills and air classifiers.

17. The system according to claim 1, further comprising a washer positioned between the waste material supply and the shredder for washing the waste material prior to shredding thereof.

18. The system according to claim 1, further comprising a conveyor positioned between any of components (a) through (f) of claim 1 for conveying the waste material through the waste material processing system.

19. The system according to claim 1, further comprising a storage device positioned between the moisture reducing device and the crusher for receiving moisture-reduced waste material from the moisture reducing device and supplying the moisture-reduced waste material to the crusher, the storage container comprising multiple storage units arranged in series such that when a first storage unit is filled with a portion of the moisture-reduced waste material, another portion of the moisture-reduced waste material subsequently received from moisture reducing device is diverted to another storage unit.

20. The system according to claim 1, further comprising a moisture separating device for receiving a moisture-laden stream separated from the moisture-reduced waste material by the moisture reducing device and separating moisture from any residual solids in the moisture-laden stream.

21. The system according to claim 1, further comprising a metal removal device positioned between the crusher and the dryer for removing metallic material from the moisture-reduced waste material.

22. The system according to claim 1, further comprising a coarse waste material separating device positioned between the crusher and the dryer for receiving the moisture-reduced waste material from the crusher and separating waste material having a length greater than about 0.025 meters from coarse waste material.

23. The system according to claim 1, further comprising a cooling device positioned between the dryer and the separating device for cooling the dried waste material received from the dryer.

24. The system according to claim 23, further comprising an air separating device positioned to receive crushed glass fibers from the secondary crusher and separate a first portion of crushed glass fibers having a mean average length of less than about 5 millimeters and a second portion of oversize glass fibers.

25. The system according to claim 1, further comprising a secondary crusher positioned to receive waste material comprising glass fibers from the waste material supply, the secondary crusher comprising at least one pair of rotatable, intermeshing rollers and a drive device for rotating at least one of the rollers such that each pair of rollers rotate at essentially the same speed, each roller having an outer surface comprising a plurality of protuberances which are essentially free of serrations, at least a portion of one protuberance of a first roller of the pair of rollers contacting a corresponding portion of at least one protuberance of a second roller of the pair of rollers for crushing glass fibers passing therebetween to form crushed glass fibers.

26. The system according to claim 1, further comprising a glass melter for receiving the dried waste material from the separating device and melting the dried waste material.

27. The system according to claim 26, further comprising a feeder positioned between the separating device and the glass melter for feeding the dried waste material into the glass melter.

28. The system according to claim 27, further comprising a mixer positioned between the separating device and the feeder for mixing the dried waste material with glass batch material.

29. A waste material processing system comprising:
(a) a waste material supply comprising waste material produced by a glass fiberizing process and comprising scrap glass fibers;
(b) a shredder positioned to receive waste material from the waste material supply, the shredder for shredding the waste material to form shredded waste material;
(c) a moisture reducing device positioned to receive shredded waste material from the shredder, the moisture reducing device for reducing the mean average moisture content of the shredded waste material to form moisture-reduced waste material;
(d) a pulverizer positioned to receive the moisture-reduced waste material from the moisture reducing device, the pulverizer for pulverizing a major portion of the moisture-reduced waste material into pulverized waste material having a mean average length of less than about 20 mesh;
(e) a dryer positioned to receive the moisture-reduced waste material from the pulverizer, the dryer for drying the moisture-reduced waste material to form dried waste material having a mean average moisture content of less than about one weight percent; and
(f) a separating device positioned to receive the dried waste material from the dryer, the separating device for separating the dried waste material into a first portion of dried waste material having a mean average length of less than about 3 millimeters from oversized dried waste material.

30. A process for recycling waste material produced by a glass fiberizing process, the waste material comprising scrap glass fibers, the process comprising the steps of:
(a) shredding glass fiber waste material;
(b) drying the glass fiber waste material to form moisture-reduced waste material;
(c) crushing the moisture-reduced waste material in a crusher comprising:
(1) a body comprising a cavity having a first end positioned to receive the moisture-reduced waste material from the moisture reducing device, a second end distal to the first end, and a length therebetween;

(2) a rotatable screw auger positioned within the cavity of the body for crushing and conveying the moisture-reduced waste material from the first end of the cavity in a first direction toward the second end of the cavity, the auger having a first end proximate the first end of the cavity, a second end proximate the second end of the cavity, and a length therebetween; and (3) a pressurizing device exerting a pressure ranging from about $1.38 \times 10^4$ to about $5.51 \times 10^6$ pascals upon at least a portion of the moisture-reduced waste material positioned about the second end of the auger in a direction generally opposite to the first direction in which the auger conveys the moisture-reduced waste material such that the portion of the scrap glass fibers in the moisture-reduced waste material are crushed to form crushed glass fibers;

(d) drying the moisture-reduced waste material received from the crusher;

(e) separating a first portion of dried waste material having a mean average length of less than about 5 millimeters from oversized dried waste material; and (f) feeding the first portion of the dried waste material to a glass melter.

* * * * *